United States Patent
Polania Castro

(10) Patent No.: US 11,722,002 B2
(45) Date of Patent: Aug. 8, 2023

(54) MANAGEMENT OF POWER SUPPLY IN ENCLOSED SPACE

(71) Applicant: Honda Motor Co., Ltd., Tokyo (JP)

(72) Inventor: Boris Hernan Polania Castro, Cupertino, CA (US)

(73) Assignee: Honda Motor Co., Ltd., Tokyo (JP)

( * ) Notice: Subject to any disclaimer, the term of this patent is extended or adjusted under 35 U.S.C. 154(b) by 543 days.

(21) Appl. No.: 17/166,815

(22) Filed: Feb. 3, 2021

(65) Prior Publication Data
US 2022/0247205 A1   Aug. 4, 2022

(51) Int. Cl.
*H02J 9/06* (2006.01)
*H02J 3/00* (2006.01)
*B60R 16/03* (2006.01)

(52) U.S. Cl.
CPC ............ *H02J 9/06* (2013.01); *B60R 16/03* (2013.01); *H02J 3/0012* (2020.01)

(58) Field of Classification Search
CPC ............ H02J 9/06; H02J 3/0012; B60R 16/03
USPC ......................................................... 307/9.1
See application file for complete search history.

(56) References Cited

U.S. PATENT DOCUMENTS

| | | | |
|---|---|---|---|
| 7,274,975 B2 | 9/2007 | Miller | |
| 8,235,755 B2 | 8/2012 | Binder | |
| 8,255,090 B2 | 8/2012 | Frader-Thompson et al. | |
| 8,487,634 B2 | 7/2013 | Masters et al. | |
| 9,088,180 B2 * | 7/2015 | Wedel | H02J 3/14 |
| 2005/0116814 A1 * | 6/2005 | Rodgers | H04B 3/54 |
| | | | 340/538 |
| 2011/0082598 A1 | 4/2011 | Boretto et al. | |
| 2016/0111918 A1 | 4/2016 | Benson | |
| 2020/0292624 A1 | 9/2020 | Tajima et al. | |

FOREIGN PATENT DOCUMENTS

| | | |
|---|---|---|
| CN | 104730365 B | 1/2018 |
| CN | 107947227 A | 4/2018 |
| WO | 2005006363 A2 | 1/2005 |
| WO | 2009023925 A1 | 2/2009 |
| WO | 2020120591 A1 | 6/2020 |

* cited by examiner

*Primary Examiner* — Richard Tan
(74) *Attorney, Agent, or Firm* — Aaron Fong; American Honda Motor Co., Inc.

(57) ABSTRACT

An electronic device and a method for management of power supply in enclosed space is provided. The electronic device determines first information indicating a disruption in a main power supply of a first enclosed space. The electronic device determines second information which indicates a power consumption of one or more electrical appliances in the first enclosed space based on the determined first information. The electronic device further determines third information associated with one or more secondary power supplies in the first enclosed space. The electronic device further applies a trained ML model on the determined first information, the second information, and the third information and determines scheduling information based on the application of the ML model. The electronic device further controls the one or more secondary power supplies to power the one or more electrical appliances, based on the determined scheduling information.

20 Claims, 7 Drawing Sheets

Input 410

410A
Disruption Detected
Estimated Time of Disruption: 08:00 – 20:00
Disruption Time Period: 12 Hours

410B
Electrical Appliances to be operated:
1 Television,
1 Computer,
1 Refrigerator,
4 Light Bulbs,
1 Air Conditioner, and
4 Fans.
Total Power Requirement: 29.64KW

410C
Secondary Power Supplies:
| Name | Availability Status | SoC |
|---|---|---|
| Inverter | Available | 90% |
| Solar Panel | Available | - |
| Power Generator | Available | - |
| Turbine | Available | - |
| Vehicle Battery | Available | 70% |

410D
Scheduling Information of at least one second enclosed space

Output 412

| Name of Secondary Supply | Order to Supply Power | Current SoC | Duration to Supply Power | Minimum SoC | Power Consumed |
|---|---|---|---|---|---|
| Turbine | 1 | - | 4 Hours | - | 12 KW |
| Solar Panel | 2 | - | 4 Hours | - | 4 KW |
| Inverter | 3 | 90% | 3 Hours | 20% | 4 KW |
| Vehicle Battery | 4 | 70% | 1 Hour | 20% | 9.64 KW |

MANAGEMENT OF POWER SUPPLY IN ENCLOSED SPACE

BACKGROUND

As different electrical appliances in a house or in an industry depend on an electric power supply for their functionality, electric power has become one of the basic necessities of a human life. With the advancement of electrical power systems for domestic as well as for industrial purposes, various types of secondary power supplies (i.e. backup power supplies) have been evolved that can be used in case of any disruption in a main power supply. Usually consumers expect a continuous main power supply for the operations of their electrical appliances, but still in certain situations, the main power supply may be disrupted as a planned or an unplanned activity, due to various reasons such as (but not limited to) an extreme weather conditions, a power maintenance exercise or a power equipment failure, etc. During the disruption of the main power supply, one or more backup power supplies may be available for a particular area (such as the house or an office). However, the effective utilization of the backup power supplies, in case of disruption in the main power supply is still tedious and troublesome.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device for management of power supply in an enclosed space is provided. The electronic device may include memory and circuitry. The memory may be coupled to the circuitry. The circuitry may determine first information indicating a disruption in a main power supply of a first enclosed space. The circuitry may further determine second information which may indicate a power consumption of one or more electrical appliances in the first enclosed space. The second information may be determined based on the first information. The circuitry may further determine third information associated with one or more secondary power supplies in the first enclosed space. The circuitry may further apply a trained ML model on the determined first information, the second information, and the third information. The circuitry may further determine scheduling information based on the application of the ML model. The determined scheduling information may indicate a schedule for the one or more secondary power supplies to power the one or more electrical appliances in the first enclosed space during the disruption in the main power supply. The circuitry may further control the one or more electrical appliances based on the determined scheduling information.

According to another embodiment of the disclosure, a method for management of power in an enclosed space is provided. The method may include determining first information indicating a disruption in a main power supply of a first enclosed space. The method may further include determining second information indicative of a power consumption of one or more electrical appliances in the first enclosed space based on the determined first information. The method may further include determining third information associated with one or more secondary power supplies in the first enclosed space. The method may further include applying a trained machine learning (ML) model on the determined first information, the second information, and the third information. The method may further include determining scheduling information based on the application of the ML model. The determined scheduling information may indicate a schedule for the one or more secondary power supplies to power the one or more electrical appliances in the first enclosed space during the disruption. The method may further include controlling the one or more secondary power supplies to power the one or more electrical appliances based on the determined scheduling information.

According to another embodiment of the disclosure, a non-transitory computer-readable medium is provided. The non-transitory computer-readable medium may have stored thereon computer implemented instructions that, when executed by an electronic device, causes the electronic device to execute operations. The operations may include determining first information indicating a disruption in a main power supply in a first enclosed space. The operations may further include determining second information indicative of a power consumption of one or more electrical appliances in the first enclosed space based on the determined first information. The operations may further include determining third information associated with one or more secondary power supplies in the first enclosed space. The operations may further include applying a trained machine learning (ML) model on the determined first information, the second information, and the third information. The operations may further include determining scheduling information based on the application of the ML model. The determined scheduling information may indicate a schedule for the one or more secondary power supplies to power the one or more electrical appliances in the first enclosed space during the disruption. The operations may further include controlling the one or more secondary power supplies to power the one or more electrical appliances based on the determined scheduling information.

BRIEF DESCRIPTION OF THE DRAWINGS

FIG. 4C is a diagram that illustrates an exemplary third scenario for management of power supply in an enclosed space, in accordance with an embodiment of the disclosure

Figure 1:
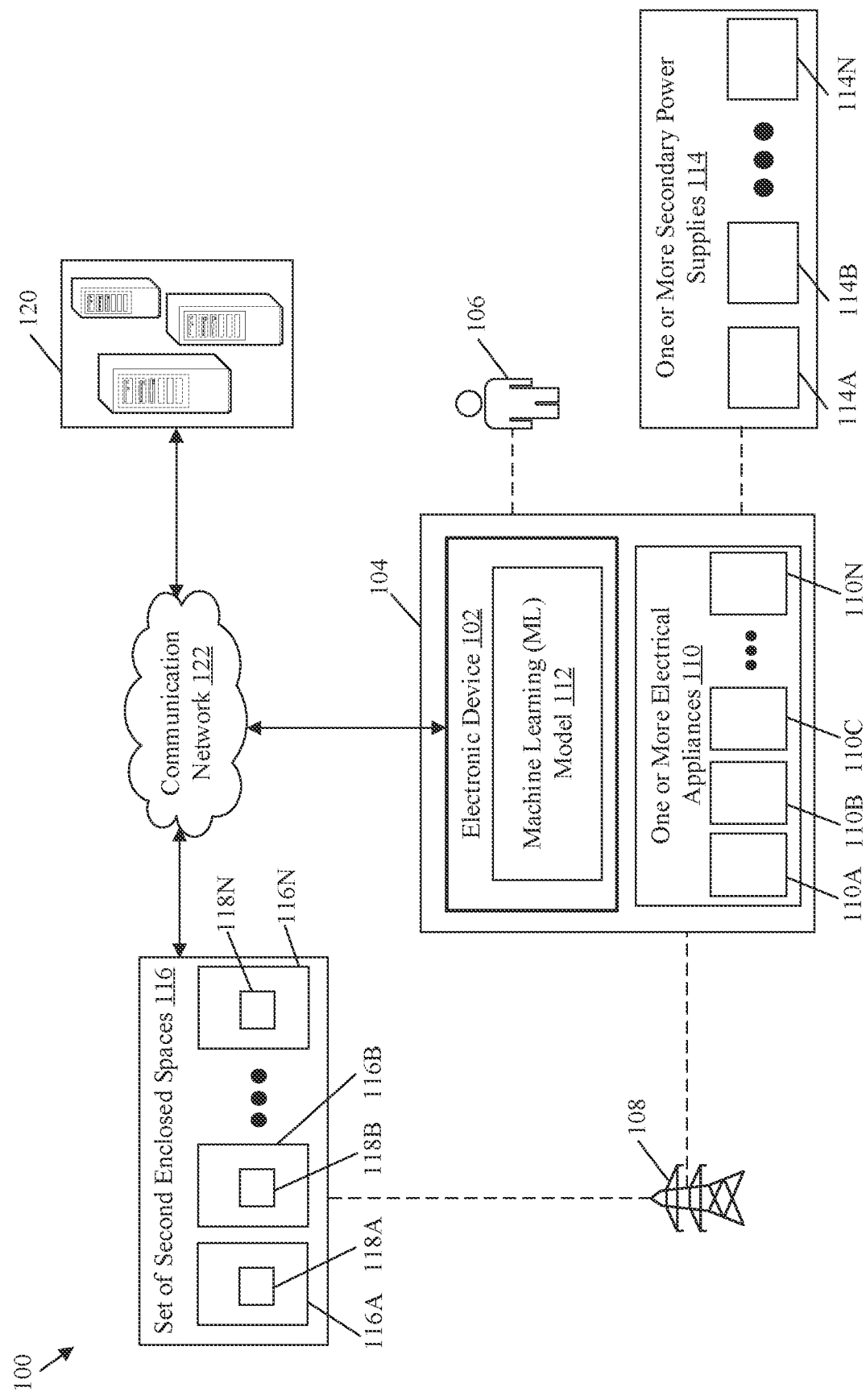
FIG. 1 is a block diagram that illustrates an exemplary network environment for management of power supply in enclosed space, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in an electronic device for management of power supply in an enclosed space. Exemplary aspects of the disclosure provide an electronic device (for example, but is not limited to, an Internet of things (IoT) device) that determines first information indicating a disruption (or power failure/outage) in a main power supply of a first enclosed space (for example, but is not limited to, a vehicle, a house, a building, etc.). The disruption may be detected based on significant drop in certain power related parameters, such as voltage, frequency, or phase. In some embodiments, the electronic device may receive the first information about the disruption (i.e. to be started) from one or more regional devices (for example a computing device of an electric grid) related to a supplier of the main power supply. The electronic device may further determine second information which may indicate a power consumption of one or more electrical appliances (for example, but is not limited to, an electric traction motor, a refrigerator, a bulb, a fan, a television, a thermostat etc.) in the first enclosed space based on the determined first information. The second information may indicate, but is not limited to, a number of electrical appliances of the one or more electrical appliances to be used in the first enclosed space during the disruption, or the power consumption of each of the one or more electrical appliances.

The electronic device may further determine third information associated with one or more secondary power supplies (or backup power supplies like invertors, solar panels, or vehicle auxiliary batteries) in the first enclosed space. The third information about the one or more secondary power supplies may include, but is not limited to, an identifier (such as name), a power source (such as solar, wind), availability information, a current state of charge (SOC), or a power storage capacity of each of the one or more secondary power supplies. The electronic device may further apply a trained machine learning (ML) model (for example, but is not limited to, a neural network (NN) model etc.) on the determined first information, the second information, and the third information. The electronic device may further determine scheduling information based on the application of the ML model on the determined first information, the second information, and the third information. The determined scheduling information may indicate a schedule (such as time schedule or an utilization order) to use the one or more secondary power supplies to power the one or more electrical appliances in the first enclosed space during the disruption in the main power supply. The electronic device may further control the one or more secondary power supplies to power the one or more electrical appliances in the first enclosed space based on the determined scheduling information. Therefore, using the scheduling information provided by the trained machine learning model, the disclosed electronic device may be capable to smartly and/or effectively manage the power supply in the first enclosed space (in case of disruption in the main power supply), based on the actual power requirements and the secondary power supplies available for the first enclosed space.

The disclosed electronic device may be further capable to select one or more secondary power supplies to be used as a primary source of power in the first enclosed space based on a user profile of a user (such owner, occupants, or residents) associated with the first enclosed space. The user profile may indicate a user preference to use the one or more electrical appliances during the disruption. Hence, the disclosed electronic device may accordingly manage the power supply based on the user preference of the corresponding user. The disclosed electronic device may be further capable to communicate with one or more electronic devices of a set of second enclosed spaces (such as neighbors) to gather information about the main power supply in the corresponding second enclosed space. The gathered information may indicate a status of the main power supply in the second enclosed space or how the electronic device of the second enclosed space handled the disruption in the main power supply. The electronic device 102 may further control the one or more secondary power supplies in the first enclosed space based on the gathered information about the second enclosed space. Therefore, the disclosed electronic device may be capable to communicate with other electronic devices in other enclosed spaces during the disruptions in the main power supply and may receive solutions (like how backup power supplies are scheduled in the other enclosed spaces).

The disclosed electronic device may be further capable to transmit a disruption notification to a first user device associated with the user and a second user device associated with a supplier of the main power supply based on the detected disruption. Therefore, the disclosed electronic device may intimate the user and the supplier of the main power supply about the detected disruption or an upcoming disruption, to allow the user to turn off one or more un-necessary electrical appliances, and to allow the supplier to work on the resolution of the disruption as soon as possible. In some embodiments, the disclosed electronic device may turn off the one or more un-necessary electrical appliances without intimating the user.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a block diagram that illustrates an exemplary network environment for management of power supply in enclosed space, in accordance with an embodiment of the disclosure. With reference to FIG. 1, there is shown a network environment diagram 100 which may include an electronic device 102 installed in a first enclosed space 104 associated with a user 106. In some embodiments, the electronic device 102 may be located outside the first enclosed space 104. The user 106 may be, but is not limited to, an owner, an occupant, a resident, or a tenant of the first enclosed space 104. There is further shown an electric grid 108 that may be a source of a main power supply in the first enclosed space 104. The first enclosed space 104 may include one or more electrical appliances 110. The electronic device 102 may include a trained machine learning (ML) model 112. In FIG. 1, there is further shown one or more secondary power supplies 114, and a set of second enclosed spaces 116. The electric grid 108 may provide the main power supply in each of the set of second enclosed spaces 116. With reference to FIG. 1, there is further shown an electric grid server 120 which may communicate with the electronic device 102, via a communication network 122.

The electronic device 102 may include suitable logic, circuitry, interfaces, and/or code that may be configured to manage power supply in the first enclosed space 104 (such as a house or a room). The electronic device 102 may determine first information associated with the main power supply of the first enclosed space 104. The main power supply may be a primary source of power in the first enclosed space 104. The first information may indicate a disruption or power failure in the main power supply. The disruption may be due to, but is not limited to, a maintenance shutdown, a power equipment failure, or extreme weather conditions. The electronic device 102 may further determine second information which may indicate a power consumption of the one or more electrical appliances 110 in the first enclosed space 104. The second information may be determined based on the determined first information (i.e. detected disruption). The electronic device 102 may further determine third information associated with the one or more secondary power supplies 114 in the first enclosed space 104. The electronic device 102 may further apply the trained ML model 112 on the determined first information, the second information, and the third information. The electronic device 102 may further determine scheduling information based on the application of the trained ML model 112. The scheduling information may indicate a schedule for the one or more secondary power supplies 114 to power the one or more electrical appliances 110 in the first enclosed space 104 during the disruption in the main power supply. The electronic device 102 may further control the one or more secondary power supplies 114 to power the one or more electrical appliances 110 in the first enclosed space 104, based on the determined scheduling information during the disruption. Examples of the electronic device 102 may include, but are not limited to, an Internet of Things (IoT) device, a computing device, a smartphone, a cellular phone, a mobile phone, a mainframe machine, a server, a computer workstation, and/or a consumer electronic (CE) device. In an embodiment, the electronic device 102 may be the IoT device pluggable into a power outlet in the first enclosed space 104.

The first enclosed space 104 and each of the set of second enclosed spaces 116 may correspond to a confined physical space. The primary source of power in the first enclosed space 104 and each of the set of second enclosed spaces 116 may be the main power supply. In an embodiment, the first enclosed space 104 and each of the set of second enclosed spaces 116 may be a house, and the primary source of power in the first enclosed space 104 and each of the set of second enclosed spaces 116 may be from the electric grid 108. In another embodiment, the first enclosed space 104 and each of the set of second enclosed spaces 116 may be a vehicle, and the primary source of power may be a battery of the vehicle to control electrical operations of the vehicle. The first enclosed space 104 and each of the set of second enclosed spaces 116 may include one or more electrical appliances 110 as well as the one or more secondary power supplies 114 that may power the one or more electrical appliances 110 in the first enclosed space 104 during the disruption in the main power supply. The set of second enclosed spaces 116 may include a second enclosed space 116A, a third enclosed space 116B, and an Nth enclosed space 116N. Each of the set of second enclosed spaces 116 may include a corresponding electronic device, a corresponding ML model, corresponding one or more electrical appliances, and corresponding one or more secondary power supplies. By way of example and not limitation, the second enclosed space 116A may include a second electronic device 118A, the third enclosed space 116B may include a third electronic device 118B, and the Nth enclosed space 116N may include an Nth electronic device 118N. In one or more embodiments, the first enclosed space 104 or each of the set of second enclosed spaces 116 may include more than one electronic device. Examples of the first enclosed space 104 and each of the set of second enclosed spaces 116 may include, but are not limited to, a room, a house, a building, a conference hall, a vehicle, an office space, a stadium (i.e. partially enclosed), or a park (i.e. partially enclosed and including electrical appliances).

The electric grid 108 may include suitable logic, circuitry, and/or interfaces, and/or code that may be configured to generate and deliver the main power supply to the first enclosed space 104 and each of the set of second enclosed spaces 116. The electric grid 108 may include multiple components such as high-voltage power lines and low-voltage power lines with one or more distribution transformers that may connect one or more power plants to the first enclosed space 104 and each of the set of second enclosed spaces 116 across a pre-defined area (such as a state or a country). The electric grid 108 may be a managed network of high voltage (HV) power transmission lines, sub-stations, low voltage (LV) distribution lines, and generation facilities (such as power plants). Although there is only one electric grid 108 shown in FIG. 1, it may be noted that there may be a plurality of electric grids, which may be communicably coupled to deliver electric power to the first enclosed space 104 and the set of second enclosed spaces 116. Examples of the electric grid 108 may include, but are not limited to, a micro-grid, a national grid, a smart grid, and other electric energy generation facilities. The electric grid 108 may be configured to deliver the electric power to the one or more electrical appliances 110, through various transmission and distribution lines.

The one or more electrical appliances 110 may include electrical or electronic appliances present in the first enclosed space 104 that may utilize power to perform their respective functionality. The one or more electrical appliances 110 may include a first electrical appliance 110A, a second electrical appliance 110B, a third electrical appliance 110C, and an Nth electrical appliance 110N, as shown in FIG. 1. The one or more electrical appliances 110 may be designed in such a way that they may be able to work on the main power supply as well as work on one or more selected secondary power supplies (such as one or more secondary power supplies 114). Examples of the one or more electrical appliances 110 may include, but are not limited to, an electric traction motor, a refrigerator, a bulb, a tube-light, a fan, a thermostat, an oven, a television (TV), an audio reproducing system, heat air ventilation and cooling system, an electric motor, and the like.

The Machine Learning (ML) model 112 may be a classifier which may be trained to identify a relationship between inputs, such as a set of features in a training dataset and an output. For example, the inputs or the set of features may include the second information related to power consumption of the one or more electrical appliances 110 and the third information related to the one or more secondary power supplies 114, and the output may include the scheduling information determined based on the application of the ML model 112. The ML model 112 may be defined by its hyper-parameters, for example, number of weights, cost function, input size, number of layers, and the like. The hyper-parameters of the ML model 112 may be tuned and weights may be updated so as to move towards a global minima of a cost function for the ML model 112. After several epochs of the training on the feature information in the training dataset, the ML model 112 may be trained to output a prediction/classification result for a set of inputs.

The ML model 112 may include electronic data, such as, for example, a software program, code of the software program, libraries, applications, scripts, or other logic or instructions for execution by a processing device, such as the electronic device 102. The ML model 112 may include code and routines configured to enable a computing device, such as the electronic device 102 to perform one or more operations for the determination of the scheduling information. Additionally, or alternatively, the ML model 112 may be implemented using hardware including a processor, a microprocessor (e.g., to perform or control performance of one or more operations), a field-programmable gate array (FPGA), or an application-specific integrated circuit (ASIC). Alternatively, in some embodiments, the ML model 112 may be implemented using a combination of hardware and software. For example, the ML model 112 may be executed based on different machine learning algorithms, such as, but not limited to Support Vector Machine (SVM) algorithm, a K-nearest neighbors (KNN) algorithm, or a random forest algorithm.

In an embodiment, the functions of the ML model 112 may be performed by at least one neural network. The neural network may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result (such as scheduling information). The number of layers and the number of nodes in each layer may be determined from hyper-parameters of the neural network. Such hyper-parameters may be set before or while training the neural network on a training dataset.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different same mathematical function. In training of the neural network, one or more parameters of each node of the neural network may be updated based on whether an output of the final layer for a given input (from the training dataset) matches a correct result based on a loss function for the neural network. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like. Examples of the neural network may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, and/or a combination of such networks. In some embodiments, the neural network may include numerical computation techniques using data flow graphs. In certain embodiments, the neural network may be based on a hybrid architecture of multiple Deep Neural Networks (DNNs).

The one or more secondary power supplies 114 may correspond to one or more backup power supplies that may act as a power backup in case of the disruption in the main power supply. The one or more secondary power supplies 114 may include a first secondary power supply 114A, a second secondary power supply 114B, and an Nth secondary power supply 114N, as shown in FIG. 1. The one or more secondary power supplies 114 may provide electrical power to the one or more electrical appliances 110 present in the first enclosed space 104 during the disruption in the main power supply in the first enclosed space 104. Each of the one or more secondary power supplies 114 may draw their power from one or more power sources. The one or more power sources may include, but is not limited to, a solar energy, a wind energy, a geothermal energy, a hydrogen energy, a wave energy, a hydroelectric energy, a biomass energy, a nuclear energy, a battery source, and a fossil fuel energy. Examples of the one or more secondary power supplies 114 may include, but are not limited to, an inverter, a fuel based power generator, a solar panel, a wind energy based power generator (i.e. a wind turbine), a hydrogen energy based generator, a biomass power generator, a vehicle battery, or a nuclear energy based power plant.

The electric grid server 120 may comprise suitable logic, circuitry, interfaces that may be configured to provide the first information to the electronic device 102. The electric grid server 120 may be associated with a supplier of the main power supply of the first enclosed space 104. The first information may indicate the disruption in the main power supply of the first enclosed space 104 and may include a first status (i.e. power failure) of the main power supply of the first enclosed space 104, first frequency information (i.e. frequency in Hertz) associated with the main power supply, first phase information (i.e. number of phases, such as single phase or three phase) associated with the main power supply, or first voltage information (i.e. in volts) associated with the main power supply of the first enclosed space 104. In some other embodiments, the electric grid server 120 may communicate a time period (for example 2 hours duration between 6:00 PM to 8:00 AM) of the disruption in the main power supply due to a planned maintenance activity to the electronic device 102. In another embodiment, the electric grid server 120 may communicate an estimated time period of the disruption in the main power supply (i.e. due to an equipment failure or an unplanned activity) to the electronic device 102. The electronic device 102 may determine the time period of disruption in the main power supply based on the communication.

In another embodiment, the electric grid server 120 may be configured to store the determined first information, the second information, and the third information for a particular time instance of the disruption (such as an event). In some other embodiments, the electric grid server 120 may be configured to train the ML model 112 to generate an output (i.e. scheduling information) based on which the one or more secondary power supplies 114 may be controlled. The electric grid server 120 may be implemented as a cloud server which may execute operations through web applications, cloud applications, HTTP requests, repository operations, file transfer, and the like. Other examples of the electric grid server 120 may include, but are not limited to, a customer relationship management database server, a database server, a file server, a web server, a media server, content server, an application server, a mainframe server, a cloud server, or other types of servers. In one or more embodiments, the electric grid server 120 may be implemented as a plurality of distributed cloud-based resources by use of several technologies that are well known to those skilled in the art.

The communication network 122 may include a communication medium through which the electronic device 102, a set of electronic devices in each of the set of second enclosed spaces 116, and the electric grid server 120 may communicate with each other. The communication network 122 may be one of a wired connection or a wireless connection. Examples of the communication network 122 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in FIG. 1 may be configured to connect to the communication network 122 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be installed or located in the first enclosed space 104 to manage the power supply in the first enclosed space 104. In some embodiments, the electronic device 102 may be located outside the first enclosed space 104 and remotely control the one or more secondary power supplies 114 to manage the power supply in the first enclosed space 104. For example, the electronic device 102 may be an IoT device that may be pluggable into a power outlet socket of the first enclosed space 104 to detect the disruption or power failure in the main power supply. To manage the power supply in the first enclosed space 104, the electronic device 102 may determine the first information. The first information may indicate the disruption or power failure in the main power supply of the first enclosed space 104. Therefore, the first information may include a first status of the main power supply, first frequency information associated with the main power supply, first phase information associated with the main power supply, first voltage information associated with the main power supply of the first enclosed space 104, or a time period of the disruption. The electronic device 102 may determine the first information based on the detected disruption from the power outlet socket or based on receipt of information about the disruption from the electric grid server 120 or from other regional devices (not shown), such as other computing devices related to electric grid server 120 (or computer workstation or server related to distribution line/system, transformers or local electricity departments).

The first status of the main power supply of the first enclosed space 104 may indicate whether the electrical power is coming from the electric grid 108 to the power outlet sockets of the first enclosed space 104 or not. The first frequency information associated with the main power supply of the first enclosed space 104 may indicate a frequency (in Hertz) of the incoming main power from the electric grid 108. The first phase information associated with the main power supply may indicate a number of phases of the incoming main power received from the electric grid 108. The first voltage information associated with the main power supply may indicate a voltage (in volts) of the incoming main power received from the electric grid 108. The time period of the disruption may indicate an estimated time of the disruption in the main power supply.

In an embodiment, the first information may be determined based on an analysis of the status of the main power supply coming at the power outlet socket at which the electronic device 102 may be inserted or installed. In another embodiment, the electronic device 102 may communicate with the second electronic device 118A installed in the second enclosed space 116A to determine the first information. The details of the determination of the first information are described further, for example, in FIG. 3.

Based on the first information, the electronic device 102 may detect the disruption in the main power supply of the first enclosed space 104. After the detection of the disruption, the electronic device 102 may determine the second information. The second information may include a number of electrical appliances of the one or more electrical appliances 110 in the first enclosed space 104, and the power consumption of each of the one or more electrical appliances 110. The number of electrical appliances of the one or more electrical appliances 110 may correspond to a count of the one or more electrical appliances 110 in the first enclosed space 104; and the power consumption of a first electrical appliance 110A of the one or more electrical appliances 110 may correspond to the electrical energy (i.e. electrical power in Watts (W), Kilo-Watts (KW), Watthour (Wh), Kilo-Watts-hour (KWh) or other units of power) that may be required by the first electrical appliance 110A to operate during the disruption. The second information may indicate total electrical power required by one or more electrical appliances 110 to operate, during the disruption using the one or more secondary power supplies 114. The details of the determination of the second information are described further, for example, in FIG. 3.

The electronic device 102 may further determine third information that may be associated with the one or more secondary power supplies 114 in the first enclosed space 104. The third information may include, but is not limited to, an identifier of each of the one or more secondary power supplies 114, a power source of each of the one or more secondary power supplies 114, availability information associated with each of the one or more secondary power supplies 114, a state of charge (SOC) of the one or more secondary power supplies 114, or a power storage capacity of each of the one or more secondary power supplies 114. The identifier of each of the one or more secondary power supplies 114 may correspond to a unique identifier (like name, or IP address) of each of the one or more secondary power supplies 114 available in the first enclosed space 104. The power source of each of the one or more secondary power supplies 114 may correspond a source of power (such as solar, wind) of each of the one or more secondary power supplies 114. The availability information associated with each of the one or more secondary power supplies 114 may indicate whether the corresponding secondary power supply is available or not to provide the power to the one or more electrical appliances 110 during the disruption. The state of charge (SOC) of each of the one or more secondary power supplies 114 may indicate a current SOC (like 40% of total capacity remaining) in the corresponding secondary power supply. The power storage capacity of each of the one or more secondary power supplies 114 may correspond to a maximum capacity of storing the power in the corresponding secondary power supply. The details about the determination of the third information are described further, for example, in FIG. 3.

In some embodiments, the electronic device 102 may further determine fourth information. The fourth information may indicate a preference of the user 106 in the first enclosed space 104 to use the one or more electrical appliances 110 during the disruption in the main power supply. The preference of the user 106 may indicate a number of the one or more electrical appliances 110, a duration of each of the one or more electrical appliances 110, or an operational mode of each of the one or more electrical appliances 110. The details about the fourth information are described further, for example, in FIG. 3.

The electronic device 102 may further determine fifth information associated with at least one of the set of second enclosed spaces 116 different from the first enclosed space 104. Specifically, the electronic device 102 may determine the fifth information based on the communication with the corresponding electronic devices in one of the set of second enclosed spaces 116. The fifth information may indicate at least one of a status of the main power supply in one of the set of second enclosed spaces 116, second frequency information (in Hertz) associated with the main power supply of one of the set of second enclosed spaces 116, second phase information associated with the main power supply of one of the set of second enclosed spaces 116, or second voltage information (in Volts) associated with the main power supply of one of the set of second enclosed spaces 116. The fifth information may indicate the disruption or power failure in the set of second enclosed spaces 116 (for example neighboring houses). In some embodiments, the fifth information may indicate the scheduling information determined by the corresponding electronic devices of the set of second enclosed spaces 116 to handle the disruption or the power failure. The details about the fifth information are described further, for example, in FIG. 3.

The electronic device 102 may further apply the stored ML model 112 on the determined first information, the second information, and the third information, and/or the determined fourth information, and/or the determined fifth information. The electronic device 102 may further determine scheduling information based on the application of the ML model 112. The determined scheduling information may indicate a schedule to utilize the one or more secondary power supplies to power the one or more electrical appliances 110 in the first enclosed space 104 during the disruption in the main power supply. The scheduling information may indicate at least one of: an order in which each of the one or more secondary power supplies 114 are to be used, timing information associated with each of the one or more secondary power supplies 114, or a maximum power to be drawn from each of the one or more secondary power supplies 114 to power the one or more electrical appliances 110 in the first enclosed space 104 during the disruption in the main power supply. The details about the scheduling information are described further, for example, in FIGS. 4A, 4B, and 4C.

Based on the determination of scheduling information, the electronic device 102 may further control the one or more secondary power supplies 114 to power the one or more electrical appliances 110 in the first enclosed space 104. The details of the application of the machine learning model 112 and the control of the one or more secondary power supplies 114 are described, for example, in FIGS. 3, 4A, 4B, and 4C.

Figure 2:
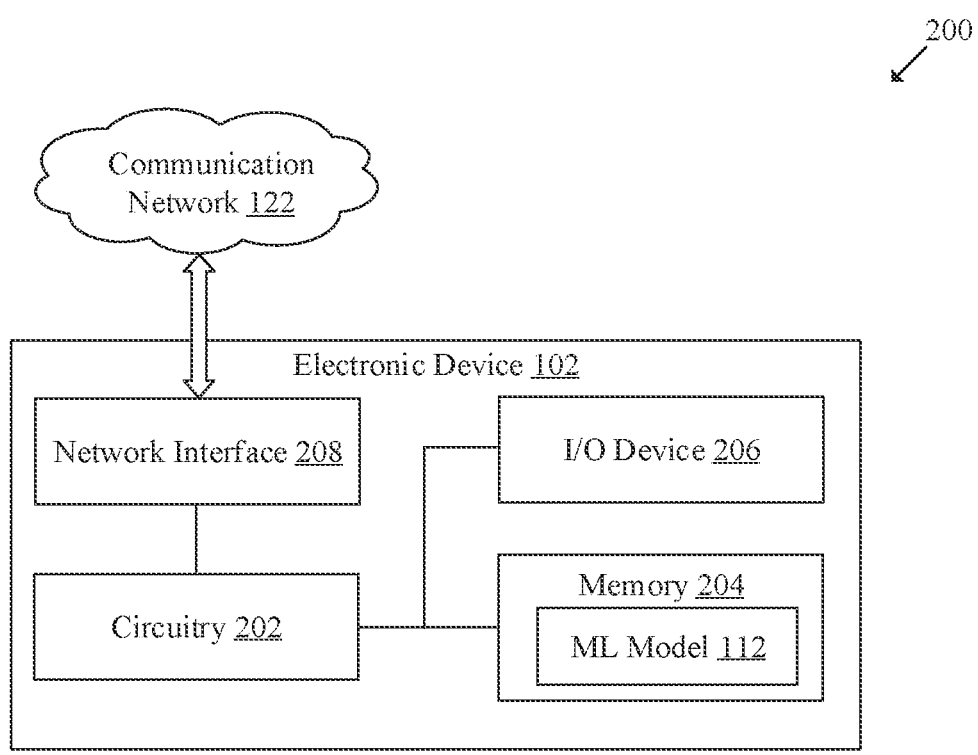
FIG. 2 is a block diagram that illustrates an exemplary electronic device for management of power supply in an enclosed space, in accordance with an embodiment of the disclosure.

FIG. 2 is a block diagram that illustrates an exemplary electronic device for management of power supply in an enclosed space, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. The circuitry 202 may be connected to the memory 204, the I/O device 206 and the network interface 208 through wired or wireless connections. Although in FIG. 2, it is shown that the electronic device 102 includes the circuitry 202, the memory 204, the I/O device 206 and the network interface 208; however, the disclosure may not be so limiting and the electronic device 102 may include less or more components to perform the same or other functions of the electronic device 102. For example, the electronic device 102 may include two or more metal pins (not shown) which may be inserted in the power outlet socket to receive the power or to detect the disruption in the main power supply. Details of the other components have been omitted from the disclosure for the sake of brevity.

The circuitry 202 may include suitable logic, circuitry, and/or interfaces that may be configured to execute a set of operations related to the management of power supply in the first enclosed space 104. The set of operations may include, but is not limited to, determination of the first information, the second information, the third information, application of the ML model 112, determination of the scheduling information, and controlling of the one or more secondary power supplies 114. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform or direct performance of any number of operations of the electronic device 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store a set of instructions executable by the circuitry 202. The memory 204 may be configured to store the first information, the second information, the third information, the fourth information, and the fifth information. The memory 204 may be further configured to store the trained ML model 112. In some embodiments, the memory 204 may be further configured to store a set of events related to the disruption in the main power supply and the corresponding determined scheduling information. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to may receive one or more user inputs and generate one or more outputs in response to the received one or more user inputs. The I/O device 206 may include one or more input and output devices that may communicate with different components of the electronic device 102. For example, the I/O devices 206 may receive user inputs from the user 106 to determine the scheduling information. In another example, the I/O device 206 may output/display the determined scheduling information or information about the disruption in the main power supply. Examples of the I/O device 206 may include, but are not limited to, a display device, a touch screen, a digital dial/knob, a touch buttons, a microphone, a gesture controller, and/or an image sensor. In an embodiment, the I/O device 206 may be configured to display the recommended one or more secondary power supplies 114 based on the determined scheduling information.

The network interface 208 may include suitable logic, circuitry, and interfaces that may be configured to facilitate communication between the circuitry 202, the one or more electrical appliances 110, the one or more secondary power supplies 114, the set of electronic devices in each of the set of second enclosed spaces 116, and the electric grid server 120, via the communication network 122. The network interface 208 may be implemented by use of various known technologies to support wired or wireless communication of the electronic device 102 with the communication network 122. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the electronic device 102, as described in FIG. 1, may be performed by the circuitry 202. Operations executed by the circuitry 202 are described in detail, for example, in the FIGS. 3, 4A, 4B, 4C, and 5.

Figure 3:
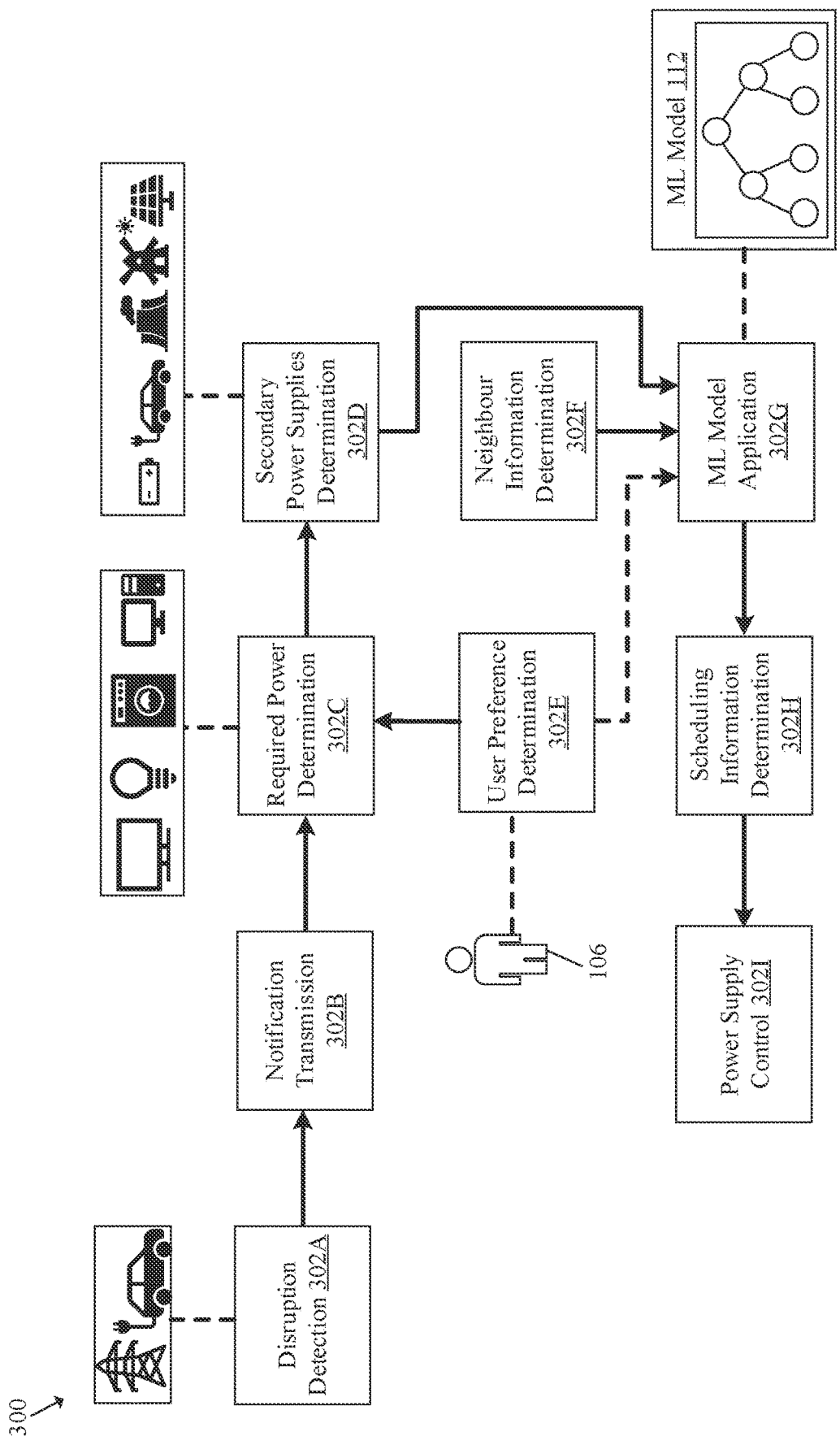
FIG. 3 is a diagram that illustrates exemplary set of operations for management of power supply in an enclosed space, in accordance with an embodiment of the disclosure.

FIG. 3 is a diagram that illustrates exemplary set of operations for management of power supply in an enclosed space, in accordance with an embodiment of the disclosure. FIG. 3 is explained in conjunction with elements from FIG. 1 and FIG. 2. With reference to FIG. 3, there is shown a block diagram 300 of exemplary operations from 302A to 302I performed by the electronic device 102 or the circuitry 202.

At 302A, a disruption detection operation may be executed. In the disruption detection operation, the circuitry 202 may detect the disruption (or power outage) in the main power supply (i.e. received from the electric grid 108) of the first enclosed space 104. The circuitry 202 may determine first information associated with the main power supply in the first enclosed space 104. The first information may indicate the disruption in the main power supply. For example, the first information 304 may include, but is not limited to, the first status of the main power supply (such as no power is available), the first frequency information associated with the main power supply (i.e. frequency in Hz of incoming power supply), the first phase information associated with the main power supply (i.e. phase), the first voltage information associated with the main power supply (i.e. voltage in Volts of incoming power supply), or the time period of the disruption (i.e. in minutes, hours, or days).

In an embodiment, the electronic device 102 may determine the first information based on the analysis of the main power supply coming from the electric grid 108. By way of example, if the electronic device 102 is a pluggable IoT device (i.e. plugged into a power outlet socket), the electronic device 102 may determine whether alternating current is flowing in a set of wires of the first enclosed space 104 or the alternating current is available at the power outlet socket, to determine the first status of the main power supply in the first enclosed space 104. In case the alternating current is flowing or available, the electronic device 102 may further determine the first phase information, the first frequency information, and/or the first voltage information related to the incoming main power supply received from the electric grid 108. The electronic device 102 may further compare the determined first phase information, the first frequency information, and/or the first voltage information with a phase threshold value, a frequency threshold value, and/or a voltage threshold value, respectively. The phase threshold value, the frequency threshold value, and the voltage threshold value may be a pre-set value in a particular geo-location (such as in a country). If the phase threshold value is significantly different from the first phase information or the frequency threshold value is significantly different from the first frequency information or the voltage threshold value is significantly different from the first voltage information, then the disruption in the main power supply may be detected. Therefore, the first information may indicate the first phase information, the first frequency information, or the first voltage information related to the main power supply to indicate the disruption or the power failure in the main power supply from the electric grid 108. In another embodiment, in case the electronic device 102 (i.e. plugged into the power outlet socket) detects that the alternating current is not flowing or unavailable, the electronic device 102 may determine the first status of the main power supply as the disruption and may indicate the first status in the first information.

In another embodiment, the electronic device 102 may receive information related to the disruption in the main power supply from one or more regional devices. The one or more regional devices may include, but is not limited to, the electric grid server 120, a server or communication device associated with a transformer of the main power supply, one or more electronic devices installed in one of the set of second enclosed spaces 116, an information transmitting device associated with a supplier of the main power supply, or communication device associated with a local power distribution authority. The electronic device 102 may further analyze the received information to determine the time period (i.e. included in the first information) of the disruption in the main power supply. By way of example and not limitation, the received information may indicate the disruption in the main power supply from 13:00 to 15:00 for maintenance purpose, as the time period of the disruption. In some other embodiments, information about the first status of the main power supply, the first frequency information, the first phase information, and/or the first voltage information may also be determined from the received information (i.e. received from the regional devices). Therefore, the circuitry 202 may determine the first information based on the information received from one or more regional devices about the planned disruption. By way of example and not limitation, the first information is provided, as follows, in Table 1:

TABLE 1

| First Information | | | | |
|---|---|---|---|---|
| Electronic Device ID | Status | Frequency | Phase | Voltage |
| 1 | Power Available | 40 Hz | Single Phase | 100 V |

With reference to Table 1, the first enclosed space 104 may be powered by electrical power from the main power supply. The frequency of the incoming power may be 40 Hz and may be of single phase and voltage of 100V. With respect to another example, where the first enclosed space 104 may be a vehicle, the disclosed electronic device 102 may be inserted in the power outlet socket of the vehicle to determine the first information (i.e. indicting disruption of the power supply from a primary battery of the vehicle). In some embodiments, the electronic device 102 may receive the first information from an in-vehicle infotainment system or an electronic control unit (ECU) of the vehicle to determine the disruption in the main power supply from the primary battery of the vehicle.

In an embodiment, the circuitry 202 of the electronic device 102 may predict the disruption in the main power supply based on the information received from the one or more regional devices (such as electronic devices of the set of second enclosed spaces 116, i.e. neighbors). For example, based on the detection of slightly lower frequency (for example reduced by certain percentage) of the main power supply, and receipt of the information about the power failures from the electronic devices of the set of second enclosed spaces 116 (i.e. neighbors), the electronic device 102 may predict that the disruption may happen in the first enclosed space 104 as well in due course (say in next certain minutes or in hours).

At 302B, a notification transmission operation may be executed. In the notification transmission operation, the circuitry 202 may transmit a disruption notification to a first user device (such as mobile phone) associated with the user 106. In another embodiment, the circuitry 202 may also transmit the disruption notification to a second user device associated with a supplier or an authority of the main power supply. The disruption notification may be transmitted based on the determined first information and may be indicative of the detected disruption. The disruption notification may be transmitted to the first user device to inform the user 106 about the disruption so that the user 106 may prepare himself/herself about the disruption or take appropriate actions (such as turn off non-essential electrical appliances). Similarly, the disruption notification may be transmitted to the second user device to inform the supplier about the disruption so that the supplier may take appropriate actions to rectify the disruption in the main power supply as soon as possible.

At 302C, required power determination operation may be executed. In the required power determination operation, the circuitry 202 may determine the second information to identify the power requirement of the one or more electrical appliances 110 to be operated during the disruption. The second information may indicate a required power consumption of the one or more electrical appliances 110 in the first enclosed space 104. Therefore, the second information may include a number of electrical appliances of the one or more electrical appliances 110, or the power consumption of each of the one or more electrical appliances 110 to be operated during the disruption. The number of electrical appliances may correspond to a count of the one or more electrical appliances 110 of a particular type which may be operated during the disruption (such as fans, lights, television, or other low power devices). The one or more electrical appliances 110 may include the electrical appliances that may be supposed to operate on the one or more secondary power supplies 114 during the disruption.

In another embodiment, the second information may include a number of electrical appliances of a set of electrical appliances, or the required power consumption of each of the set of electrical appliances. The set of electrical appliances may include all the electrical appliances that may be present in the first enclosed space 104 (such a house). The set of electrical appliances may be switched on or off based on a requirement of the user 106 and the first status of the main power supply. In such a scenario, the one or more electrical appliances 110 may be a subset of the set of electrical appliances. By way of example and not limitation, the second information is provided, as follows, in Table 2:

TABLE 2

| Second Information | | | | |
|---|---|---|---|---|
| S. No | Name of Electrical Appliance | Number of Electrical Appliances | Appliance ID | Power Consumption (Watts-Hour) |
| 1 | Television | 3 | 1 | 80 watts-hour |
| 2 | Refrigerator | 1 | 2 | 150 watts-hour |
| 3 | Light Bulb | 10 | 3 | 60 watts-hour |
| 4 | Water Pump | 1 | 4 | 2000 watts-hour |
| 5 | Air Conditioner | 3 | 5 | 1500 watts-hour |
| 6 | Fan | 7 | 6 | 75 watts-hour |
| 7 | Washing Machine | 1 | 7 | 500 watts-hour |
| 8 | Computer | 2 | 8 | 200 watts-hour |

With reference to Table 2, for example, the first enclosed space 104 may include three televisions, one refrigerator, ten light bulbs, one water pump, three air conditioners, seven fans, one washing machine, and two computers as the set of electrical appliances. Each television may consume 80 watts of power in one hour. The refrigerator may consume 150 watts of power in one hour. Each light bulb may consume 60 watts of power in one hour. The water pump may consume 2000 watts of power in one hour. Each fan may consume 75 watts of power in one hour. Each air conditioner may consume 1500 watts of power in one hour. The washing machine may consume 500 watts of power in one hour and each computer may consume 200 watts of power in one hour.

In an embodiment, the circuitry 202 of the electronic device 102 may determine the required total power consumption (as the second information) of the one or more electrical appliances 110 (i.e. from the set of electrical appliances) that is to be operated during the disruption. In some embodiments, the one or more electrical appliances 110 (like which all electrical devices and number of the electrical device of different types) have to be operated, is predefined. As shown in FIG. 3, the one or more electrical appliances 110 to be operated during the disruption may include a television, a bulb, a washing machine, and a computer. In some other embodiments, the one or more electrical appliances 110 to be operated during the disruption may vary based on different factors, such as but not limited to, exact time (i.e. morning, afternoon, evening, night) of the disruption, preference of the user 106, an event associated with the first enclosed space 104 (i.e. party time, movie time, study time, dinner time, sleep time), or required power consumption of electrical devices. Examples of different selected one or more electrical appliances 110 to be operated during the disruption are provided, for example, in FIGS. 4A-4C.

At 302D, secondary power supplies determination operation may be executed. In the secondary power supplies determination operation, the circuitry 202 may be configured to determine third information that may be associated with the one or more secondary power supplies 114 in the first enclosed space 104. The third information may indicate information about the available secondary power supplies (i.e. backup power supplies for the first enclosed space 104) that may be utilized to operate the one or more electrical appliances 110 during the disruption of the main power supply. The determined third information may include, but is not limited to, an identifier of each of the one or more secondary power supplies, a power source of each of the one or more secondary power supplies 114, availability information associated with each of the one or more secondary power supplies 114, a state of charge (SOC) of each of the one or more secondary power supplies 114, or a power storage capacity of each of the one or more secondary power supplies 114. The one or more secondary power supplies 114 may include, but is not limited to, an inverter, a fuel based power generator, a solar energy based power generator, a wind energy based power generator, a hydrogen energy based power generator, a biomass based power generator, a battery of a vehicle, a nuclear energy based power generator, or a battery operated electrical device. In an embodiment, the third information may be provided by the user 106 during a set-up phase of the electronic device 102. In some other embodiments, the circuitry 202 of the electronic device 102 may automatically detect the one or more secondary power supplies 114 available in the first enclosed space 104. The circuitry 202 may communicate with each of the one or more secondary power supplies 114 to determine the third information about each of the one or more secondary power supplies 114. By way of example and not limitation, the circuitry 202 of the electronic device 102 may transmit an information request to the one or more secondary power supplies 114 to determine the SoC of each of the one or more secondary power supplies 114. Each of the one or more secondary power supplies 114 may transmit the SoC to the electronic device 102 based on the transmitted information request. In an embodiment, the one or more secondary power supplies 114 may include a communication processor/circuitry to communicate with the electronic device 102. In an embodiment, information (such as the identifier, power source, availability information, and/or maximum power storage capacity) of each of the one or more secondary power supplies 114 is already stored in the memory 204 of the electronic device 102. The circuitry 202 may extract such information from the memory 204 and receive information about the current SOC (and/or current availability) from each of the one or more secondary power supplies 114 to determine the third information. By way of example and not limitation, the third information is provided, as follows, in Table 3:

TABLE 3

Third Information

| Identifier | Name | Power Source | Whether Available? | State of Charge (SoC) | Power Capacity |
|---|---|---|---|---|---|
| 1 | Inverter | Electricity | Yes | 90% | 5 KW Total |
| 2 | Solar Panel | Solar | Yes | — | 1 KWh |
| 3 | Power Generator | Fuel | Yes | — | 4.5 KWh |
| 4 | Turbine | Wind | Yes | — | 3 KWh |
| 5 | Vehicle Battery | Electricity generated based on Vehicle motion | Yes | 70% | 20 KW Total |

With reference to Table 3, the one or more secondary power supplies 114 in the first enclosed space 104 (such as house, building) may include, but is not limited to, an inverter, a solar panel, a power generator, a turbine, and a vehicle battery. The power source of the inverter may be electricity. The power source of the solar panel may be solar energy. The power source of the power generator may be fuel (for example, diesel). Similarly, the power source of the turbine may be wind and the power source of vehicle battery may be an electric charge generated based on vehicle's motion. The one or more secondary power supplies 114 may be available to provide power to the one or more electrical appliances 110 during the disruption in the main power supply. For example, the inverter and the vehicle battery may have current SoC as 90% and 70% respectively, as shown in Table 3. In an embodiment, the circuitry 202 of the electronic device 102 may select the one or more secondary power supplies 114 (i.e. from a set of secondary power supplies associated with the first enclosed space 104) based on different factors such as, but are not limited to, a time period of the disruption, availability, or current SOC. For example, the solar panel may be available during a day time period of the disruption, but may be unavailable during a night time period. In another example, an inverter may not useful if the current SOC is below a specific threshold (for example below 10%), or if the inverter is not operational due to certain internal faults. Therefore, the circuitry 202 of the electronic device 102 may determine the third information to indicate different information (i.e. as per Table 3) about the one or more secondary power supplies 114, to be used to power the one or more electrical appliances 110 in the first enclosed space 104 during the disruption in the main power supply. It may be noted that the one or more secondary power supplies 114 indicated in Table 3 are presented, merely as examples. There may be other types of secondary power supplies, without departing from the scope of the present disclosure. For example, in case of the first enclosed space 104 as the vehicle, the one or more secondary power supplies 114 may include different auxiliary batteries or DC power sources.

At 302E, user preference determination operation may be executed. In the user preference determination operation, the circuitry 202 may determine fourth information which may indicate a preference of the user 106 in the first enclosed space 104 to use the one or more electrical appliances 110 during the disruption in the main power supply. The preference may indicate at least one of: a number of the one or more electrical appliances 110, a duration of each of the one or more electrical appliances 110, or an operational mode of each of the one or more electrical appliances 110. The number of the one or more electrical appliances 110 may correspond to a count of the electrical appliances of a particular type that the user 106 may prefer to use during the disruption in the main power supply. For example, as per the preference of the user 106, the fourth information may indicate that five bulbs have to be operated during the disruption. The duration of each of the one or more electrical appliances 110 may correspond to a time duration for which the user 106 may prefer to use the corresponding electrical appliance during the disruption in the main power supply. For example, as per the preference of the user 106, the fourth information may indicate that the television is to be operated for maximum one hour during the disruption. The operational mode of each of the one or more electrical appliances 110 may indicate the operational mode of the corresponding electrical appliance preferred by the user 106. For example, as per the preference of the user 106, the fourth information may indicate that fans should be operated at a medium speed (out of three operational modes as low, medium, high), a refrigerator should operate at power saving mode (i.e. operational mode) to save power during the disruption.

In some embodiments, the user preference (i.e. fourth information) may be provided as a user input to the electronic device 102 (via the I/O device 206 shown in FIG. 2). In some other embodiments, the electronic device 102 may automatically learn the user preference associated with the user 106 based on the analysis of the operational mode and time of operation of the one or more electrical appliances 110 over a period of time (say last 30 days). As an example, if the user 106 watches television every day from 14:00 to 15:00 hours from last 20 days, then the user preference may automatically include the television for the duration of 1 hour between 14:00 to 15:00 hours included in the time period of the disruption. By way of example and not limitation, the fourth information is provided, as follows, in Table 4:

TABLE 4

| | | Fourth Information | | |
|---|---|---|---|---|
| S. No | Name of Electrical Appliance | Number of Electrical Appliances | Duration | Operational Mode |
| 1 | Television | 1 | 1 hour | On |
| 2 | Light Bulb | 4 | 2 hours | Power Saving |
| 3 | Fan | 2 | 2 hours | Medium Speed |

With reference to Table 4, the user preference (i.e. fourth information) may indicate that the user 106 may prefer to use one television for the duration of 1 hour during the disruption, use 4 light bulbs (in power saving mode) and 2 fans (at medium speed) for the duration of 2 hours, respectively. In an embodiment, the circuitry 202 may determine the fourth information (i.e. user preference) based on calendar information stored on the first user device of the user 106 (or stored in the memory 204) and/or determine the fourth information based on the first information indicating the time period of the disruption. For example, in case of the detected disruption and the calendar information indicates that the user 106 has a video conference meeting, then the fourth information may indicate that the computer in the first enclosed space 104 has to be operated during the disruption for a complete duration of the video conference meeting. In another example, if the time period of the disruption is between 5:00 PM to 7:00 PM, and the calendar information of the user 106 indicates a party time at a particular room, that the fourth information may indicate that all light/bulbs, fans, and a music system should be operated in the same room as per the calendar information.

In an embodiment, as shown in FIG. 3, the determined fourth information may be provided as an input to the required power determination operation 302C. In other words, the circuitry 202 may determine the second information about the required power of the one or more electrical appliances 110, based on the user preference (i.e. fourth information). In some other embodiments, the determined fourth information may be provided as the input to the trained ML model 112 to determine the scheduling information (i.e. described, for example, at 302H and in FIGS. 4A-4C).

At 302F, neighbour information determination operation may be executed. In the neighbour information determination operation, the circuitry 202 may be configured to determine fifth information associated with at least one second enclosed space of the set of second enclosed spaces 116. Each of the set of second enclosed spaces 116 may be different from the first enclosed space 104 and may be located within a pre-determined distance from the first enclosed space 104. By way of example, the second enclosed space 116A may correspond to a neighbour house or a different room in the first enclosed space 104. Each of the set of second enclosed spaces 116 may have a corresponding electronic device (i.e. similar to the electronic device 102). By way of example, (as shown in FIG. 1) the second enclosed space 116A may include the second electronic device 118A, the third enclosed space 116B may include the third electronic device 118B, and the Nth enclosed space 116N may include the Nth electronic device 118N.

The fifth information may indicate information about the disruption of the main power supply in the second enclosed space 116A, as indicated by the first information about the disruption in the first information. Therefore, the fifth information may indicate at least of a second status of the main power supply of the second enclosed space 116A, second frequency information (i.e. frequency in Hz) associated with the main power supply of the second enclosed space 116A, second phase information (i.e. number of phases) associated with the main power supply of the second enclosed space 116A, or second voltage information (i.e. voltage in Volts) associated with the main power supply of the second enclosed space 116A. In an embodiment, the circuitry 202 may be configured to receive the fifth information from the corresponding electronic device of the second enclosed space 116A, to determine the fifth information indicating the happened disruption in the second enclosed space 116A. In an embodiment, the circuitry 202 of the electronic device 102 may determine the first information (as described at 302A) based on the receipt of the fifth information from the corresponding electronic device of the second enclosed space 116A. By way of example and not limitation, the fifth information is provided, as follows, in Table 5:

TABLE 5

Fifth Information

| Electronic Device ID at Set of Second Enclosed Spaces | Status | Frequency | Phase | Voltage |
|---|---|---|---|---|
| 2 | Power Available | 60 Hz | Single Phase | 100 V |
| 3 | Power Unavailable | 10 Hz | Single Phase- | 10 V- |

With reference to Table 5, the fifth information may indicate that the status of the main power supply in the second enclosed space 116A may be "Available'" whereas the status of the main power supply in the third enclosed space 116B may be "Unavailable". The fifth information may also indicate that the frequency of the main power supply in the second enclosed space 116A may be "60" Hz, the voltage as "100" V and the phase may be a Single phase. Similarly, the status, the frequency, the phase, and the voltage of the main power supply in the third enclosed space 116B may be "Unavailable, "10" Hz, "Single Phase" and "10V", respectively.

In some embodiments, the fifth information may also include the scheduling information related to one or more secondary power supplies related to at least one of the set of second enclosed spaces 116. The scheduling information in the fifth information may indicate how one of the set of second enclosed spaces 116 has handled the disruption in the main power supply in past based on their determined scheduling information. Further, the electronic device 102 of the first enclosed space 104 may utilize or refer the scheduling information (included in the fifth information of the second enclosed space 116A) to determine the scheduling information for the first enclosed space 104. In some embodiments, the fifth information received from the electronic device of the second enclosed space 116A may indicate which particular secondary power supplies (such as solar panel) are used at the second enclosed space 116A, such that the electronic device 102 may provide appropriate recommendation to the user 106, via the first user device, to purchase or deploy similar secondary power supplies (such as solar panel) in the first enclosed space 104 to handle the disruption.

At 302G, an ML model application operation may be performed. In the ML model application operation, the circuitry 202 may be configured to apply the trained ML model 112 to the determined first information, the second information, and the third information. In some other embodiments, the ML model 112 may be applied to the determined first information, the second information, the third information, along with the determined fourth information, and the fifth information. The ML model 112 may be trained to determine information about the one or more secondary power supplies 114 to be used to power the one or more electrical appliances 110 during the disruption in the main power supply. The ML model 112 may be stored in the memory 204 of the electronic device 102. The ML model 112 may be trained on a relationship between an input and an output (and their corresponding variations), where the input may correspond to the first information (i.e. indicating information about the disruption), the second information (i.e. indicating an amount of total power to be consumed by the one or more electrical appliances 110 during the disruption), and the third information (i.e. indicating information about the one or more secondary power supplies 114 which may be used to power the one or more electrical appliances 110 during disruption). The output of the trained ML model 112 may correspond to the scheduling information which may indicate an effective schedule to utilize or control the one or more secondary power supplies 114 to power the one or more electrical appliances 110 during the disruption. Certain examples of the variations of the input and the output of the trained ML model 112 are provided, for example, in FIGS. 4A-4C.

At 302H, a scheduling information determination operation may be executed. In the scheduling information determination operation, the circuitry 202 may determine the scheduling information based on the application of the ML model 112 on the determined first information, the second information, and the third information, (and further on the determined fourth information, and/or the fifth information). In one or more embodiments, the scheduling information may be determined based on the determined fourth information (i.e. user preference), the fifth information (i.e. information about the neighbors) and the application of the ML model 112 only on the determined first information, the second information, and the third information.

The scheduling information may indicate a schedule for the one or more secondary power supplies 114 to operate and power the one or more electrical appliances 110 in the first enclosed space 104 during the disruption in the main power supply. Specifically, the scheduling information may indicate at least one of an order in which each of the one or more secondary power supplies 114 are to be operated, timing information (i.e. duration of operation) associated with each of the one or more secondary power supplies 114, or a maximum power (in Watts) to be drawn from each of the one or more secondary power supplies 114 to power the one or more electrical appliances 110 in the first enclosed space 104 during the disruption in the main power supply. The details of the scheduling information are described further, for example, in FIGS. 4A, 4B, and 4C.

In an embodiment, the circuitry 202 may store, in the memory 204, the determined first information, the second information, the third information, the fourth information, and/or the fifth information, and the determined scheduling information as a first event of a set of events of the disruption in the main power supply at a particular time instant. At a second time instant, the circuitry 202 may detect a second event of the disruption in the main power supply. The second event of the disruption may be similar to the first event of the disruption. For example, the second event may happen at a same time period (i.e. 2:00 PM to 4:00 PM) or may have same power requirement of the one or more electrical appliances 110 to be operated during the disruption and/or may have same availability/SOC of the one or more secondary power supplies 114, as compared with the first event of the disruption. Therefore, the circuitry 202 may further determine the first information, the second information, the third information related to the detected second event of the disruption in the main power supply. The circuitry 202 may further retrieve information about the set of events from the memory 204. The circuitry 202 may further compare at least the determined first information (i.e. time period) and the second information (i.e. required power of the one or more electrical appliances 110) related to the detected second event with the first information and the second information, respectively, in each of the stored set of events. In case, the determined first information and the second information related to the detected second event matches with the first information and the second information of the first event of the stored set of events, the circuitry 202 may further retrieve the corresponding stored scheduling information related to the first event. In some embodiments, in addition to the first information and the second information, the circuitry 202 may compare the third information related to the first event and the second event to retrieve the corresponding stored scheduling information related to the first event.

The circuitry 202 may further control the one or more secondary power supplies 114 to power the one or more electrical appliances 110 in the first enclosed space 104, during the second detected event, based on the retrieved scheduling information. Thus, in case of occurrence of similar disruption situations, the circuitry 202 may retrieve appropriate past solutions (i.e. scheduling information) stored in the memory 204, rather than determining the scheduling information in real-time based on the application of the ML model 112. Therefore, time saving may be achieved to control the power supply during the disruption.

At 302I, a power supply control operation may be executed. In the power supply control operation, the circuitry 202 may be configured to control the one or more secondary power supplies 114 to operate and power the one or more electrical appliances 110 based on the determined scheduling information. In an example, for the control, the circuitry 202 may send one or more commands to the one or more secondary power supplies 114, to activate or deactivate the one or more secondary power supplies 114 to power the one or more electrical appliances 110. The one or more electrical appliances 110 may work due to the power supplied by the one or more secondary power supplies 114 controlled during the disruption in the main power supply in the first enclosed space 104. Based on the determined scheduling information, the disclosed electronic device 102 may effectively schedule (i.e. time duration and an order of operation) and control the power supplied by the one or more secondary power supplies 114 for efficient and smooth functioning of the one or more electrical appliances 110 during the disruption in the main power supply. For example, as per the scheduling information, the circuitry 202 of the electronic device 102 may first control (i.e. activate) the inverter to operate for one hour and provide power to the one or more electrical appliances 110, and further control (i.e. activate) the solar panel, say for two hours, to provide the power to the one or more electrical appliances 110 during the disruption of three hours.

In some embodiments, the one or more electrical appliances 110 in the first enclosed space 104 may be connected to the one or more secondary power supplies 114 through a switching circuit (not shown) controlled by the electronic device 102. Based on the control of the switching circuit, the electronic device 102 may allow a particular secondary power supply (such as inverter) to supply power to the one or more electrical appliances 110 at a particular time, and deactivate other secondary power supplies to supply the power to the one or more electrical appliances 110 at the same time. The details about the control of the one or more secondary power supplies 114 based on the scheduling information are described further, for example, in FIGS. 4A, 4B, and 4C.

In an embodiment, the electronic device 102 may be configured to transmit recommendation information to the user device associated with the user 106 in the first enclosed space 104. The recommendation information may recommend the user 106 to use the one or more secondary power supplies 114 during the disruption in the main power supply. In some embodiments, the recommendation information may further indicate at least one of information related to the one or more electrical appliances 110, or information related to the one or more secondary power supplies 114. By way of example and not limitation, the recommendation information may include first fault information about technical faults in at least one electrical appliance due to which the electrical appliance may consume more power, or may include second fault information about technical faults in at least one secondary power supply which may be unavailable most of the time. Thus, based on the recommendation information, the user 106 may know which particular electrical appliance may consume more power during the disruption due to internal faults and further may know which secondary power supply is mostly unavailable (i.e. due to internal component fault) to operate the one or more electrical appliances 110 during the disruption. In some embodiments, the recommendation information may further include information that may assist the user 106 to resolve the corresponding faults. For example, the information may indicate a website link associated with a brand of the electrical appliance (or secondary power supply); or may indicate location information (i.e. geo-location) of a nearest service center of the brand, to further resolve the fault at the corresponding electrical appliance or the secondary power supply. In some embodiments, the recommendation information may provide information about some non-essential electrical appliances (for example a gaming devices, decorative lights) which may be turned-off during or before the disruption in the main power supply.

In certain embodiments, the recommendation information may indicate information (such as identifier or names) about the one or more secondary power supplies 114 to use during the disruption. The electronic device 102 may further receive a first user input corresponding to a selection of a first secondary power supply (such as the first secondary power supply 114A) from the one or more secondary power supplies 114. Based on the first user input, the user 106 may provide his/her preference to use particular secondary power supplies to be used to operate the one or more electrical appliances 110 during the disruption. For example, the received first user input may indicate to use only the invertor and the solar panel during current disruption, but not the vehicle battery as the user 106 may have a travel plan using the vehicle. The electronic device 102 may further determine the scheduling information based on the received first user input indicating the selected secondary power supplies to be controlled to power the one or more electrical appliances 110 in the first enclosed space 104 during the disruption or power failure.

Figure 4A:
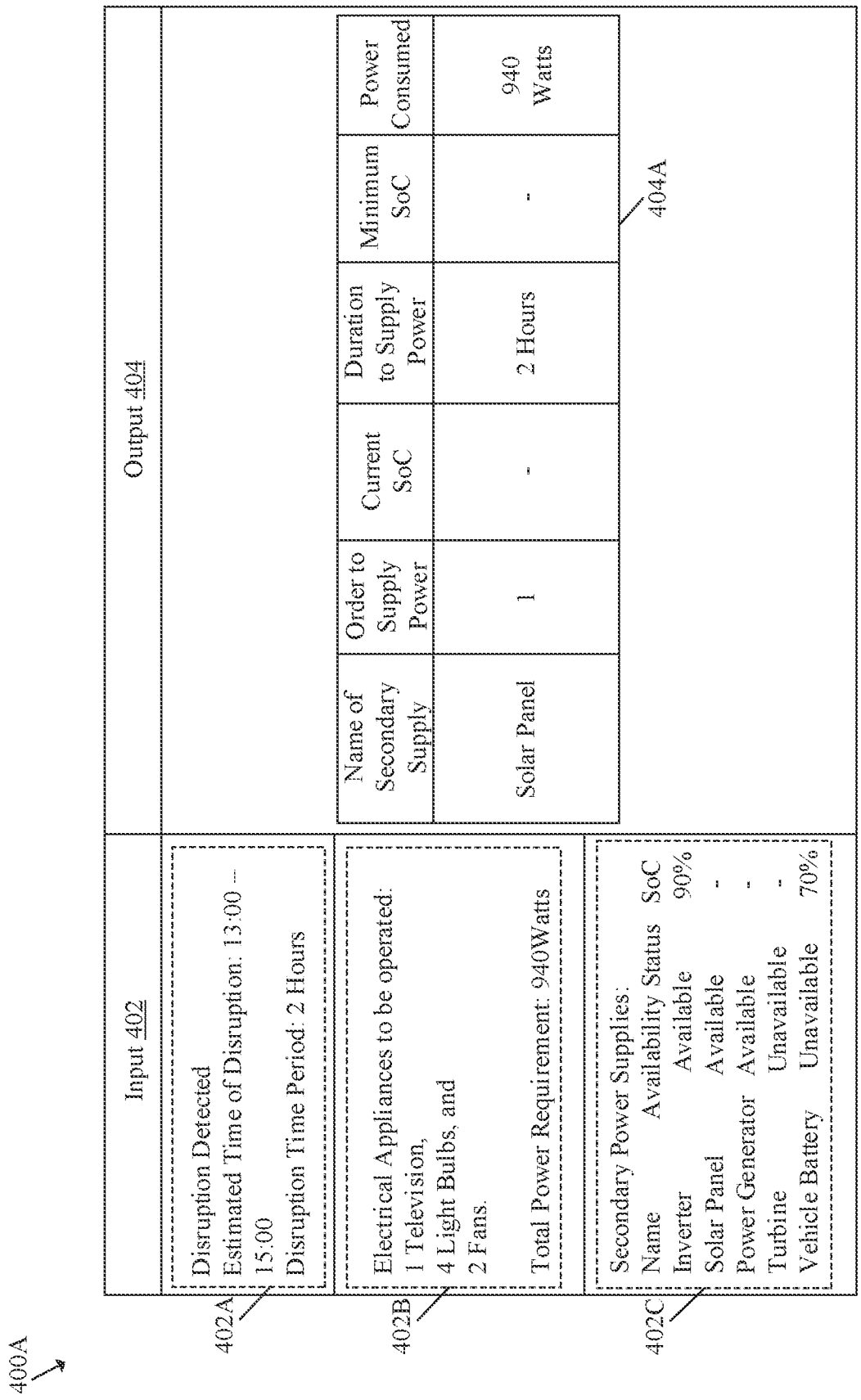
FIG. 4A is a diagram that illustrates an exemplary first scenario for management of power supply in an enclosed space, in accordance with an embodiment of the disclosure.

FIG. 4A is a diagram that illustrates an exemplary first scenario for management of power supply in an enclosed space, in accordance with an embodiment of the disclosure. FIG. 4A is explained in conjunction with elements from FIG. 1, FIG. 2, and FIG. 3. With reference to FIG. 4A, there is shown an exemplary table 400A that may be bifurcated into an input section 402 and an output section 404. The input section 402 may include exemplary first information 402A, second information 402B, and third information 402C that may be provided as an input the ML model 112. The output section 404 may include exemplary scheduling information 404A that may be the output of the ML model 112.

For example, the circuitry 202 may determine the first information 402A that may be indicative of a disruption in the main power supply of the first enclosed space 104 for 2 hours from 13:00 to 15:00 hours, as shown in FIG. 4A. Specifically, the disruption may be due to, but is not limited to, a planned maintenance activity, an unplanned equipment failure, a weather condition. Based on the detected disruption, the circuitry 202 may determine the second information 402B. The determined second information 402B may indicate the power consumption of the one or more electrical appliances 110 that may be supposed to be functional even in case of the disruption in the main power supply of the first enclosed space 104. With reference to Table 2 and FIG. 4A, the one or more electrical appliances 110 that may be functional during the disruption may include one television, four light bulbs, and two fans. The total power consumption of such electrical appliances, for 2 hours, may be around 940 Watts or a total power requirement during the disruption may be 940 Watts, as shown (for example) by the second information 402B in FIG. 4A.

The circuitry 202 may further determine third information 402C associated with the one or more secondary power supplies 114 in the first enclosed space 104. The one or more secondary power supplies 114 may be used to power the one or more electrical appliances 110 during the disruption in the main power supply, as described, for example, at 302D in FIG. 3. With reference to Table 3, the one or more secondary power supplies 114 may include an inverter, a solar panel, a power generator, a turbine, and a vehicle battery. As shown, the SoC of the inverter may be 90% and the SoC of the vehicle battery may be 70% of total power capacity. As shown in the third information 402C, for example, based on the time period of the disruption or based on user selection, out of the one or more secondary power supplies 114, the inverter, the solar panel, and the power generator may be available, whereas the turbine and the vehicle battery may be unavailable to provide the power to the one or more electrical appliances 110 (such as one television, four bulbs, and two fans as shown in the second information 402B).

The first information 402A, the second information 402B, and the third information 402C may be provided as an input to the trained ML model 112. Specifically, the trained ML model 112 may be applied on the first information 402A, the second information 402B, and the third information 402C. In some other embodiments, other information related to, but is not limited to, a location of the first enclosed space 104, weather forecast information associated with the first enclosed space 104 may also be provided as the input to the ML model 112. The weather forecast information (i.e. received from an environmental server (not shown)) may indicate information such as a clear weather with bright sunlight in the location of the first enclosed space 104. The circuitry 202 may further determine the scheduling information 404A, as the output of the ML model 112. The scheduling information 404A may indicate a schedule for the one or more secondary power supplies to power the one or more electrical appliances 110 in the first enclosed space 104 during the disruption. Based on the application of the ML model 112 on the first information 402A, the second information 402B, and the third information 402C, for example, the determined scheduling information 404A may indicate to use the solar panel for the entire duration of the disruption (i.e. 2 hours during the day time 13:00-15:00 as indicated by the first information 402A). The scheduling information 404B may also indicate a power consumption of the solar panel for the duration to supply the power to the one or more electrical appliances 110 indicated by the second information 402B. As shown in the scheduling information 404A in the output section 404 the total power drained from the solar panel may be 940 Watts that may be similar to the required power to operate the one or more electrical appliances 110 during the disruption. The circuitry 202 may further control the solar panel to power the one or more electrical appliances 110 for the duration of 2 hours (i.e. timing information).

It may be noted that the scheduling information 404A in FIG. 4A indicates usage of the solar panel (that may work on solar energy) among other alternatives in the one or more secondary power supplies 114, based on the weather forecast, the time period of the disruption, and/or the user preference (i.e. fourth information) of the user 106. The ML model 112 may be trained in such a way that the selected one or more secondary power supplies 114 may be cheap, reliable, and/or eco-friendly to power the one or more electrical appliances 110 during the disruption. In another embodiment, the weather forecast information may indicate a cloudy, a thunderstorm or a rain in the location of the first enclosed space 104, then the determined scheduling information 404A may indicate the usage of either of the inverter or the vehicle battery (rather than solar panel), as the one or more secondary power supplies 114 to power the one or more electrical appliances 110 during the disruption in the first enclosed space 104.

Figure 4B:
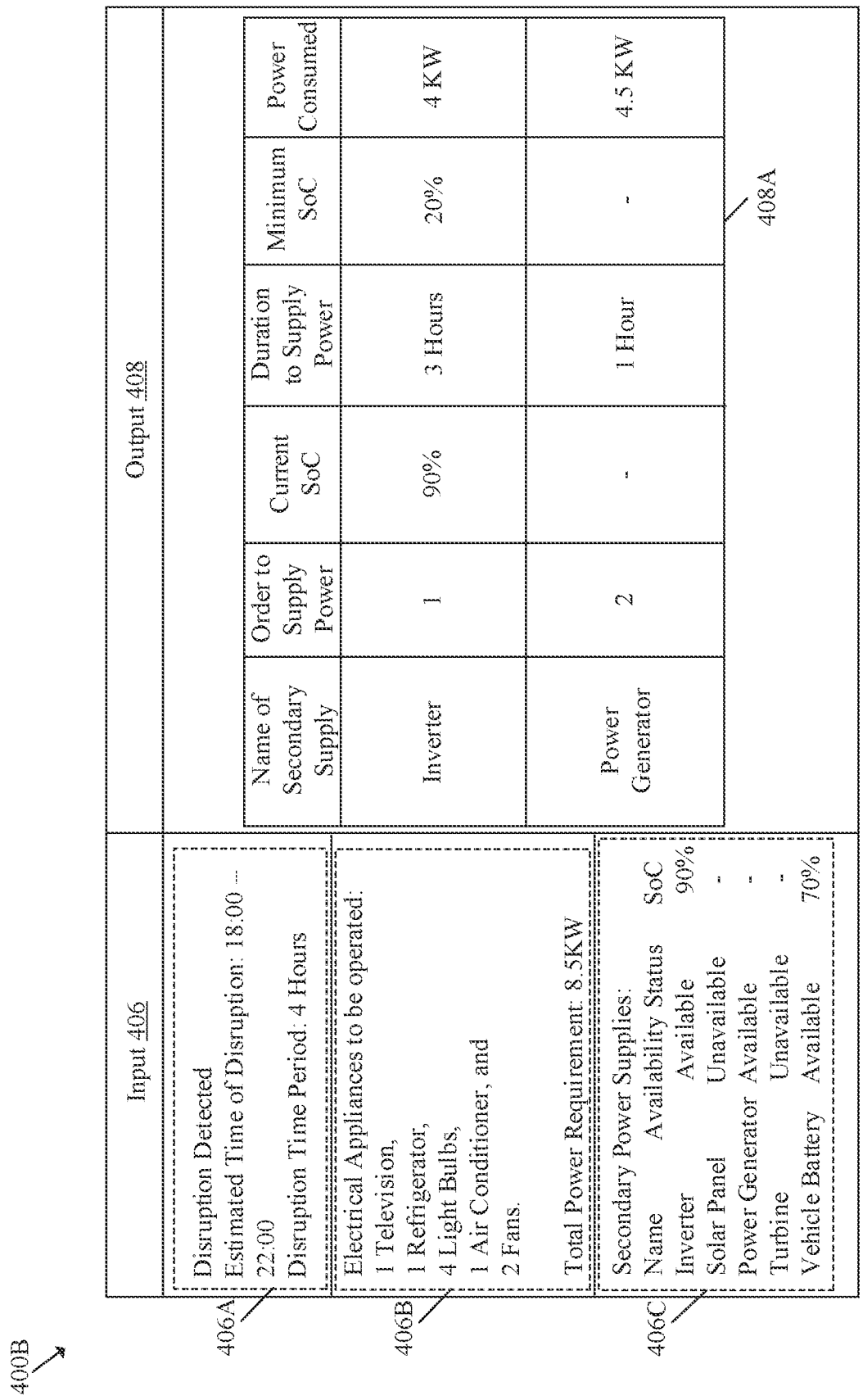
FIG. 4B is a diagram that illustrates an exemplary second scenario for management of power supply in an enclosed space, in accordance with an embodiment of the disclosure.

FIG. 4B is a diagram that illustrates an exemplary second scenario for management of power supply in an enclosed space, in accordance with an embodiment of the disclosure. FIG. 4B is explained in conjunction with elements from FIG. 1, FIG. 2, FIG. 3, and FIG. 4A. With reference to FIG. 4B, there is shown an exemplary table 400B that may be bifurcated into an input section 406, and an output section 408. The input section 406 may include exemplary first information 406A, second information 406B, and third information 406C that may be provided as an input the ML model 112. The output section 408 may include exemplary scheduling information 408A that may be provided as an output of the ML model 112.

For example, the circuitry 202 may determine the first information 406A indicative of a disruption in the main power supply of the first enclosed space 104 for four hours from 18:00 to 22:00 hours, as shown in FIG. 4B. Based on the detected disruption, the circuitry 202 may determine the second information 402B. The second information 402B may indicate a power consumption of the one or more electrical appliances that may be required to be functional even in case of the disruption in the main power supply in the first enclosed space 104. With reference to Table 2 and FIG. 4B, for example, the one or more electrical appliances 110 that may be functional during the disruption may include one television, one refrigerator, four light bulbs, one air conditioner, and two fans and the total power consumption of such electrical appliances, for 4 hours, may be around 8.5 Kilo-Watts. The one or more electrical appliances 110 selected in the second information 406B may also be based on the user preference (i.e. fourth information) as described, for example, at 302E at FIG. 3.

The circuitry 202 may further determine third information 402C associated with the one or more secondary power supplies 114 in the first enclosed space 104. The one or more secondary power supplies 114 may be used to power the one or more electrical appliances 110 during the disruption in the main power supply, as described, for example, at 302D in FIG. 3. With reference to Table 3, the one or more secondary power supplies 114 may include an inverter, a solar panel, a power generator, a turbine, and a vehicle battery. As shown, the SoC of the inverter may be 90% and the SoC of the vehicle battery may be 70% of total power capacity. As shown in the third information 406C, for example, based on the time period of the disruption or based on user selection out of the one or more secondary power supplies 114, the inverter, the power generator, and the vehicle battery may be available whereas the solar panel and the turbine may be unavailable to provide the power to the one or more electrical appliances 110 (such as one television, one refrigerator, four light bulbs, one air conditioner, and two fans as shown in the second information 406B). The solar panel may be unavailable as the time period (i.e. first information) indicates that the disruption is from 18:00 hours to 22:00 Hours (i.e. from late evening) when the sunlight may be minimal and therefore, the solar panel may not be available.

In some other embodiments, the circuitry 202 may further determine the fourth information that may be indicate a preference of the user 106 in the first enclosed space 104 to use the one or more electrical appliances 110 during the disruption in the main power supply. The circuitry 202 may automatically determine the total power consumption of the one or more electrical appliances 110 selected based on the user preference as described, for example, at 302E in FIG. 3. By way of example, the user preference may indicate that the user 106 may wish to additionally use the water pump for a pre-defined time (say 1 hour) during the disruption, as per the need of the family in the first enclosed space 104. In such case, the total power requirement may be 10.5 KW (8.5 KW+2 KW) to operate the selected one or more electrical appliances 110 during the disruption.

The first information 402A, the second information 402B, and the third information 402C, (in addition the fourth information) may be provided as an input to the trained ML model 112. The circuitry 202 may further determine the scheduling information 408A, as the output of the ML model 112. The scheduling information 408A may indicate a schedule to use the one or more secondary power supplies 114 to power the one or more electrical appliances 110 (one television, one refrigerator, four light bulbs, one air conditioner, and two fans) in the first enclosed space 104 during the disruption. Based on the application of the ML model 112 on the first information 402A, the second information 402B, and the third information 402C, and (further on the fourth information), the determined scheduling information 408A may indicate an order, such as firstly use the inverter for a duration of three hours (i.e. timing information) of the disruption and then use the power generator for the duration of next one hour (i.e. timing information) of the disruption to provide power to the selected one or more electrical appliances 110 during the disruption (say for four hours between 18:00-22:00 hours as shown in FIG. 4B). For example, the vehicle battery may not be indicated in the scheduling information 408A, based on the fourth information (i.e. the user 106 may have travel plans during certain duration of the disruption) and the selected inverter and the power generator may sufficiently handle the disruption based on the power requirement of the one or more electrical appliances 110 for the time period (i.e. four hours) of the disruption.

As shown in FIG. 4B, the scheduling information 408A may further indicate the power consumption of each of the selected one or more secondary power supplies 114 (such as the inverter and the power generator). With reference to Table 3, the power consumption from the inverter for three hours may be 4 KW (i.e. based on discharge from 100% SOC to 20% SOC) and the power consumption from the power generator for remaining one hour may be 4.5 KW. As shown in the scheduling information 408A in the output section 408, the total power drained from the inverter and the power generator may be substantially similar to the required power to operate the one or more electrical appliances 110 during the disruption. After the power consumed from the inverter, the current SoC of the inverter may drop from 90% to a minimum SoC of 20%. The minimum SOC may correspond to a minimum pre-set level of SoC till which the battery of the inverter can be discharged. The minimum SOC of a particular secondary power supply may be set based on the user inputs or preference, or based on a technical product specification of the secondary power supply. For example, the user 106 does not want the battery of the inverter to be discharged beyond 20% and wants to still keep certain SOC (like between 20% to 1%) as backup. In another example, as per the technical product specification, a particular secondary power supply should be used to a certain SOC (like till 20%) to enhance their life-cycle.

The circuitry 202 may further control the inverter to power the one or more electrical appliances 110 for the duration of three hours and then further control the power generator to power the one or more electrical appliances 110 for the rest of duration of one hour. Therefore, the scheduling information 408A received from the trained ML model 112 may provide the schedule and the order to control different available secondary power supplies (i.e. selected by the ML model 112 based on the first information, the second information, the third information and the fourth information) to effectively power the one or more electrical appliances 110 during the disruption.

FIG. 4C is a diagram that illustrates an exemplary third scenario for management of power supply in an enclosed space, in accordance with an embodiment of the disclosure. FIG. 4C is explained in conjunction with elements from FIG. 1, FIG. 2, FIG. 3, FIG. 4A, and FIG. 4B. With reference to FIG. 4C, there is shown an exemplary table 400C that may be bifurcated into an input section 410, and an output section 412. The input section 410 may include exemplary first information 410A, second information 410B, third information 410C, fifth information 410D that may be provided as an input the ML model 112. The output section 412 may include exemplary scheduling information 412A that may be provided as an output of the ML model 112.

For example, the circuitry 202 may determine the first information 410A indicative of a disruption in the main power supply of the first enclosed space 104 for 12 hours from 08:00 to 20:00 hours, as shown in FIG. 4C. Based on the detected disruption, the circuitry 202 may determine the second information 410B. The second information 410B may indicate a power consumption of the one or more electrical appliances 110 that may be required to be functional even in the case of disruption in the main power supply in the first enclosed space 104. With reference to Table 2 and FIG. 4C, for example, the one or more electrical appliances 110 that may be functional during the disruption may include one television, one computer, one refrigerator, four light bulbs, one air conditioner, and four fans; and the total power consumption of such one or more electrical appliances 110, for 12 hours, may be around "29.64" Kilo-Watts. In an embodiment, the one or more electrical appliances 110 may be selected based on the user preference (i.e. fourth information) as described, for example, at 302E in FIG. 3.

The circuitry 202 may further determine third information 402C associated with the one or more secondary power supplies 114 in the first enclosed space 104. The one or more secondary power supplies 114 may be used to power the one or more electrical appliances 110 during the disruption in the main power supply, as described, for example, at 302D in FIG. 3. With reference to Table 3, the one or more secondary power supplies 114 may include an inverter, a solar panel, a power generator, a turbine, and a vehicle battery. Each of the one or more secondary power supplies 114 i.e. the inverter, the solar panel, the power generator, the turbine, and the vehicle battery may be available (fully or partially) to operate the one or more electrical appliances 110 (i.e. second information 410B) for the time period of the disruption (i.e. 12 Hours between 8:00 to 20:00 Hours).

In some other embodiments, the circuitry 202 may further determine the fifth information 410D associated with the second enclosed space 116A different from the first enclosed space 104. Specifically, the fifth information may include the scheduling information related to one or more secondary power supplies in the second enclosed space 116A as described, for example, at 302F in FIG. 3. By way of example, the fifth information may be similar to the scheduling information 404A or the scheduling information 408A. In case the first information 410A, the second information 410B, and the third information 410C matches with the similar information of one of the set of second enclosed spaces 116 (like second enclosed space 116A), the electronic device 102 may receive the scheduling information (i.e. fifth information 410D) from an electronic device of the second enclosed space 116A. In some embodiments, even if the first information 410 (i.e. time period of disruption) of the first enclosed space 104 matches with corresponding first information of the second enclosed space 116A (i.e. which may had disruption at same time period in past), the electronic device 102 may receive the scheduling information (i.e. fifth information 410D) of the second enclosed space 116A. Further, as per the second information 410B (i.e. power requirement of the one or more electrical appliances 110 of the first enclosed space 104) and the third information 410C (i.e. available secondary power supplies in the first enclosed space 104), the electronic device 102 may update the scheduling information received from the second enclosed space 116A, and accordingly determine the scheduling information 412A (shown in FIG. 4C) based on the update.

The first information 410A, the second information 410B, and the third information 410C, (further the fourth information and/or fifth information 410D) may be provided as an input to the trained ML model 112. The circuitry 202 may further determine the scheduling information 412A, as the output of the ML model 112. The scheduling information 412A may indicate a schedule for the one or more secondary power supplies 114 to power the one or more electrical appliances 110 in the first enclosed space 104 during the disruption. Based on the application of the ML model 112 on the first information 410A, the second information 410B, and the third information 410C, (and further on the fourth information and the fifth information 410D), the determined scheduling information 412A may indicate to firstly use the turbine for a duration of first four hours (i.e. morning time) of the disruption, then use the solar panel for the duration of next four hours (i.e. timing information) of the disruption, then use the inverter for the duration of next three hours (i.e. timing information) of the disruption, and finally to use the vehicle battery for the duration of remaining one hour (i.e. timing information) of the disruption (i.e. total 12 hours as per the first information 410A).

The scheduling information 412A may also indicate the power consumption from the turbine, the solar panel, the inverter, and the vehicle battery. With respect to Table 3, for example, the power consumption from the turbine for four hours may be 12 KW and the power consumption from the solar panel for next four hours may be 4 KW. Similarly, the power consumption from the inverter for next three hours may be 4 KW (considering 90% SOC to 20% SOC change) and the power consumption from the vehicle battery for remaining one hour may be 9.64 KW (considering 70% SOC to minimum 20% SOC change), as shown in the scheduling information 412A in FIG. 4C.

In an embodiment, the circuitry 202 may further control the turbine to provide power (i.e. maximum 12 KW) to the one or more electrical appliances 110 for the duration of four hours. The circuitry 202 may further control the solar panel to power (i.e. maximum 4 KW) the one or more electrical appliances 110 for the duration of next four hours and further control the inverter to power (i.e. maximum 4 KW) the one or more electrical appliances 110 for the duration of three hours, and finally control the vehicle battery (i.e. maximum 9.64 KW) to power the one or more electrical appliances 110 for the remaining duration of one hour. The electronic device 102 may control the turbine, solar panel, the inverter and the vehicle battery to withdraw maximum power of 12 KW, 4 KW, 4 KW and 9.64 KW, respectively, to power the one or more electrical appliances 110 based on the scheduling information 412A. Therefore, the scheduling information 412A received from the trained ML model 112 may provide the schedule and the order to control different available secondary power supplies (i.e. selected by the ML model 112 based on the first information, the second information, and the third information) to effectively power the one or more electrical appliances 110 during the disruption.

It may be noted that the scheduling information may indicate usage of the turbine for which source of energy may be wind, and the weather forecast information may indicate that the heavy wind is available in the morning time (8:00 to 12:00) in the location of the first enclosed space 104. The weather forecast information may also indicate bright sunlight from 12:00 till 16:00 time period and therefore, the electronic device 102 may indicate usage of the solar panel for the four hours as indicated in the scheduling information 412A. In the evening (for three hours between 16:00 to 19:00), the priority may be given to the inverter rather than the vehicle battery, as the vehicle may be required for the travel during this duration. For remaining one hour, the electronic device 102 (using the ML model 112) may choose the vehicle battery over the power generator based on the amount of power available, for example, the power generator may not have a sufficient quantity of fuel in the power generator to provide the required power to the one or more electrical appliances 110 for remaining one hour of the disruption.

In some embodiments, if the one or more secondary power supplies 114 in the first enclosed space 104 can provide more power than the power required in the first enclosed space 104, the electronic device 102 may be configured to control at least one secondary power supplies to provide an extra power to the electrical appliances of at least one of the set of second enclosed spaces 116. The extra power may be provided to one of the set of second enclosed spaces 116 based on a pre-configured setting (i.e. stored in the memory 204) set by the user 106. Thus, the disclosed electronic device 102 may be capable to manage the power requirement of the first enclosed space 104 for the user 106, as well as manage the power requirements of other enclosed spaces around the first enclosed space 104. In some embodiments, the disclosed electronic device 102 may control the one or more secondary power supplies 114 to transfer the stored power or extra power back to the electric grid 108 which may allow the user 106 to sell the power to the electric grid 108.

Figure 5:
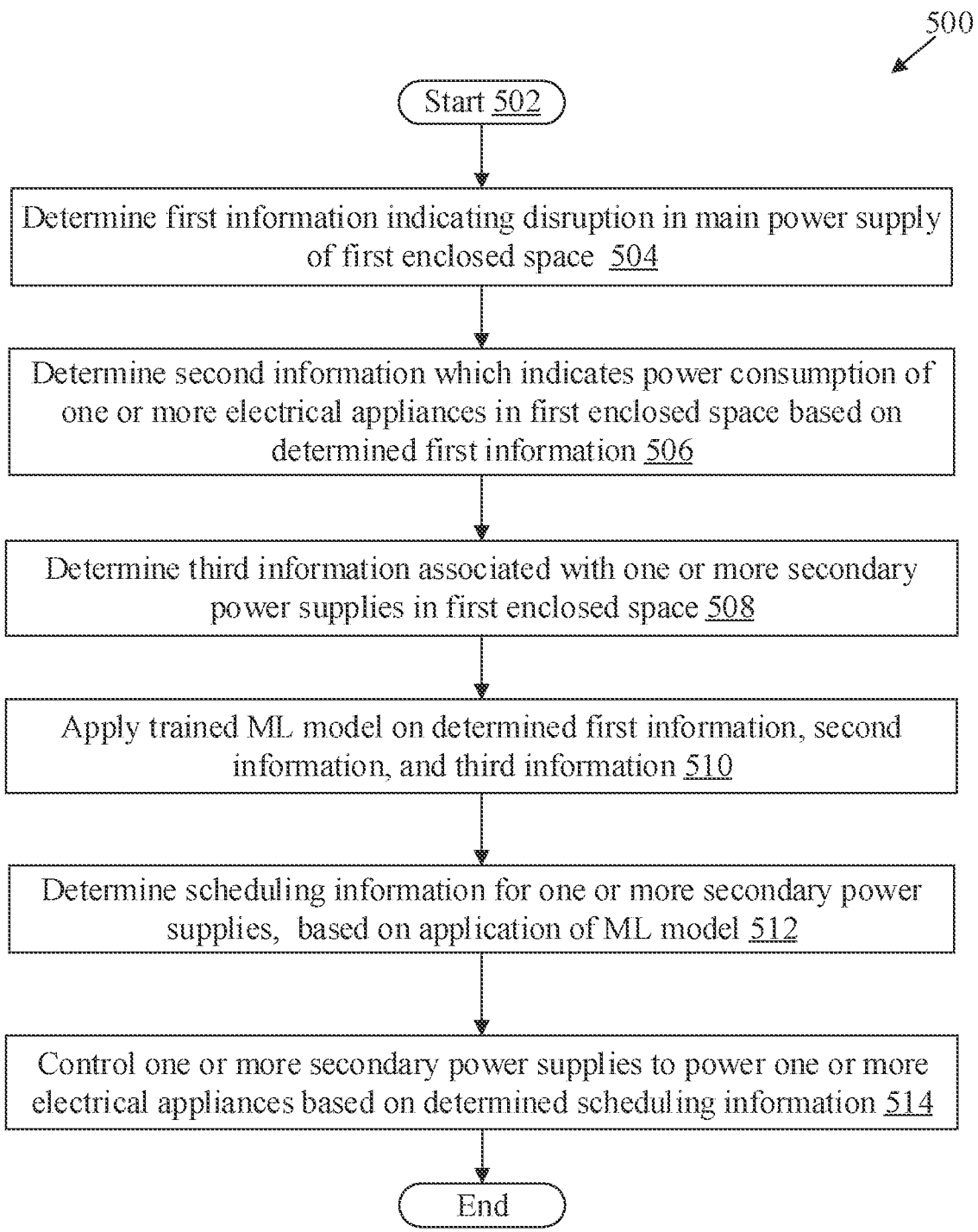
FIG. 5 is a flowchart that illustrates exemplary operations for management of power supply in enclosed space, in accordance with an embodiment of the disclosure.

FIG. 5 is a flowchart that illustrates exemplary operations for management of power supply in an enclosed space, in accordance with an embodiment of the disclosure. With reference to FIG. 5, there is shown a flowchart 500. The flowchart 500 is described in conjunction with FIGS. 1, 2, 3, 4A, 4B, and 4C. The operations from 502 to 514 may be implemented, for example, by the electronic device 102 of FIG. 1 or the circuitry 202 of FIG. 2. The operations of the flowchart 500 may start at 502 and proceed to 504.

At 504, first information may be determined. The first information may be indicative of a disruption in a main power supply of the first enclosed space 104. In accordance with an embodiment, the electronic device 102 or the circuitry 202 may be configured to determine the first information indicating the disruption in the main power supply of the first enclosed space 104 as described, for example, in FIG. 1 and at 302A in 3.

At 506, second information may be determined. The second information may indicate a power consumption of the one or more electrical appliances 110 in the first enclosed space 104 based on the determined first information. In accordance with an embodiment, the electronic device 102 or the circuitry 202 may be configured to determine the second information which indicates the power consumption of the one or more electrical appliances 110 in the first enclosed space 104 based on the determined first information as described, for example, at 302C in FIG. 3.

At 508, third information may be determined. The third information may be associated with one or more secondary power supplies 114 in the first enclosed space 104. In accordance with an embodiment, the electronic device 102 or the circuitry 202 may be configured to determine the third information associated with one or more secondary power supplies 114 in the first enclosed space 104, as described, for example, at 302D in FIG. 3.

At 510, a trained machine learning (ML) model 112 may be applied. The trained ML model 112 may be applied on the determined first information, the second information, and the third information. In accordance with an embodiment, the electronic device 102 or the circuitry 202 may be configured to apply the trained ML model on the determined first information, the second information, and the third information, as described, for example, in FIG. 1 and at 302G in FIG. 3.

At 512, scheduling information may be determined. The scheduling information may be determined based on the application of the trained ML model 112 on the determined first information, the second information, and the third information. In accordance with an embodiment, the electronic device 102 or the circuitry 202 may be configured to determine the scheduling information for one or more secondary power supplies 114, based on the application of the trained ML model 112, as described, for example, in FIGS. 4A, 4B, and 4C and at 302H in FIG. 3.

At 516, the one or more secondary power supplies 114 may be controlled. The one or more secondary power supplies 114 may be controlled to power the one or more electrical appliances 110 based on the determined scheduling information. In accordance with an embodiment, the electronic device 102 or the circuitry 202 may be configured to control the one or more secondary power supplies 114 to power the one or more electrical appliances 110 based on the determined scheduling information, as described, for example, in FIGS. 4A, 4B, and 4C and at 302I in FIG. 3. Control may further pass to end.

Various embodiments of the disclosure may provide a non-transitory, computer-readable medium and/or storage medium, and/or a non-transitory machine readable medium and/or storage medium stored thereon, a set of instructions executable by a machine and/or a computer (such as the electronic device 102) for management of power supply in an enclosed space. The set of instructions may be executable by the machine and/or the computer to perform operations that may include determining first information indicating a disruption in a main power supply of a first enclosed space. The operations may further include determining second information which may indicate a power consumption of one or more electrical appliances in the first enclosed space based on the determined first information. The operations may further include determining third information associated with one or more secondary power supplies in the first enclosed space. The operations may further include application of the trained ML model on the determined first information, the second information, and the third information. The operations may further include determining scheduling information based on the application of the ML model. The determined scheduling information may indicate a schedule for the one or more secondary power supplies to power the one or more electrical appliances in the first enclosed space during the disruption. The operations may further include controlling the one or more secondary power supplies to power the one or more electrical appliances based on the determined scheduling information.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
 circuitry coupled to a memory, wherein the circuitry:
  determines first information indicating a disruption in a main power supply of a first enclosed space;

determines second information which indicates a power consumption of one or more electrical appliances in the first enclosed space based on the determined first information;

determines third information associated with one or more secondary power supplies in the first enclosed space;

applies a trained machine learning (ML) model on the determined first information, the second information, and the third information;

determines scheduling information based on the application of the ML model, wherein the determined scheduling information indicates a schedule for the one or more secondary power supplies to power the one or more electrical appliances in the first enclosed space during the disruption; and controls the one or more secondary power supplies to power the one or more electrical appliances, based on the determined scheduling information.

2. The electronic device according to claim 1, wherein the first enclosed space is a vehicle.

3. The electronic device according to claim 1, wherein to indicate the disruption, the first information comprises at least one of: a first status of the main power supply, first frequency information associated with the main power supply, first phase information associated with the main power supply, first voltage information associated with the main power supply, or a time period of the disruption.

4. The electronic device according to claim 1, wherein the second information comprises at least one of: a number of electrical appliances of the one or more electrical appliances, or the power consumption of each of the one or more electrical appliances.

5. The electronic device according to claim 1, wherein the third information comprises at least one of: an identifier of each of the one or more secondary power supplies, a power source of each of the one or more secondary power supplies, availability information associated with each of the one or more secondary power supplies, a state of charge (SOC) of each of the one or more secondary power supplies, or a power storage capacity of each of the one or more secondary power supplies.

6. The electronic device according to claim 1, wherein the circuitry further:

receives information related to the disruption in the main power supply from one or more regional devices; and determines the first information associated with the main power supply based on the received information from the one or more regional devices.

7. The electronic device according to claim 1, wherein the circuitry further:

determines fourth information which indicates a preference of a user in the first enclosed space, to use the one or more electrical appliances during the disruption in the main power supply;

applies the trained ML model on the determined first information, the second information, the third information, and the fourth information;

determines the scheduling information based on the application of the ML model; and controls the one or more secondary power supplies to power the one or more electrical appliances, based on the determined scheduling information.

8. The electronic device according to claim 7, wherein the preference indicates at least one of: a number of the one or more electrical appliances, a duration of each of the one or more electrical appliances, or an operational mode of each of the one or more electrical appliances.

9. The electronic device according to claim 1, wherein the circuitry further:

transmits a disruption notification to a first user device and a second user device based on the determined first information, and wherein the first user device is associated with a user in the first enclosed space, and the second user device is associated with a supplier of the main power supply.

10. The electronic device according to claim 1, wherein the circuitry further:

determines fifth information associated with at least one second enclosed space different from the first enclosed space;

applies the rained ML model on the determined first information, the second information, the third information, and the fifth information;

determines the scheduling information based on the application of the ML model; and controls the one or more secondary power supplies to power the one or more electrical appliances in the first enclosed space, based on the determined scheduling information.

11. The electronic device according to claim 10, wherein the fifth information indicates at least one of: a second status of a main power supply of the at least one second enclosed space, second frequency information associated with the main power supply of the at least one second enclosed space, second phase information associated with the main power supply of the at least one second enclosed space, or second voltage information associated with the main power supply of the at least one second enclosed space.

12. The electronic device according to claim 10, wherein the fifth information comprises scheduling information related to one or more secondary power supplies in the at least one second enclosed space.

13. The electronic device according to claim 1, wherein the one or more secondary power supplies comprise at least one of: an inverter, a fuel based power generator, a solar energy based power generator, a wind energy based power generator, a hydrogen energy based power generator, a biomass based power generator, a battery of a vehicle, a nuclear energy based power generator, or a battery operated electrical device.

14. The electronic device according to claim 1, wherein the scheduling information further indicates at least one of: an order in which each of the one or more secondary power supplies are to be used, timing information associated with each of the one or more secondary power supplies, or a maximum power to be drawn from each of the one or more secondary power supplies to power the one or more electrical appliances in the first enclosed space during the disruption in the main power supply.

15. The electronic device according to claim 1, wherein the memory further stores the first information, the second information, and the determined scheduling information as a first event of the disruption in the main power supply, and wherein the circuitry further:

detects a second event of the disruption in the main power supply;

determines the first information and the second information related to the detected second event of the disruption in the main power supply;

retrieves the stored scheduling information of the first event of the disruption from the memory, based on the determined first information and the determined second information related to the detected second event of the disruption in the main power supply; and controls the one or more secondary power supplies to power the one or more electrical appliances in the first enclosed space, based on the retrieved scheduling information.

16. The electronic device according to claim 1, wherein the circuitry further:

transmits recommendation information, to use the one or more secondary power supplies during the disruption, to a user device associated with a user in the first enclosed space;

receives a first user input corresponding to a selection of a first secondary power supply from the one or more secondary power supplies; and determines the scheduling information based on the received first user input.

17. The electronic device according to claim 16, wherein the recommendation information further indicates at least one of: information related to the one or more electrical appliances, or information related to the one or more secondary power supplies.

18. A method, comprising:

in an electronic device:

determining first information indicating a disruption in a main power supply of a first enclosed space;

determining second information which indicates a power consumption of one or more electrical appliances in the first enclosed space based on the determined first information;

determining third information associated with one or more secondary power supplies in the first enclosed space;

applying a trained machine learning (ML) model on the determined first information, the second information, and the third information;

determining scheduling information based on the application of the ML model, wherein the determined scheduling information indicates a schedule for the one or more secondary power supplies to power the one or more electrical appliances in the first enclosed space during the disruption; and controlling the one or more secondary power supplies to power the one or more electrical appliances, based on the determined scheduling information.

19. The method according to claim 18, wherein the first enclosed space is a vehicle.

20. A non-transitory computer-readable storage medium having stored thereon computer implemented instructions that, when executed by an electronic device, causes the electronic device to execute operations, the operations comprising:

determining first information indicating a disruption in a main power supply of a first enclosed space;

determining second information which indicates a power consumption of one or more electrical appliances in the first enclosed space based on the determined first information;

determining third information associated with one or more secondary power supplies in the first enclosed space;

applying a trained machine learning (ML) model on the determined first information, the second information, and the third information;

determining scheduling information based on the application of the ML model, wherein the determined scheduling information indicates a schedule for the one or more secondary power supplies to power the one or more electrical appliances in the first enclosed space during the disruption; and controlling the one or more secondary power supplies to power the one or more electrical appliances, based on the determined scheduling information.

* * * * *